(12) United States Patent
Greer et al.

(10) Patent No.: US 8,332,104 B2
(45) Date of Patent: Dec. 11, 2012

(54) SYSTEM AND METHOD FOR PERFORMING AUTO-LOCATION OF A TIRE PRESSURE MONITORING SENSOR ARRANGED WITH A VEHICLE WHEEL

(75) Inventors: John Greer, Randalstown (IE); Samuel Strahan, Broughshane (IE)

(73) Assignee: Schrader Electronics Ltd., Northern Ireland (GB)

(*) Notice: Subject to any disclaimer, the term of this patent is extended or adjusted under 35 U.S.C. 154(b) by 0 days.

(21) Appl. No.: 13/222,653

(22) Filed: Aug. 31, 2011

(65) Prior Publication Data

US 2011/0313623 A1    Dec. 22, 2011

Related U.S. Application Data

(63) Continuation-in-part of application No. 12/888,247, filed on Sep. 22, 2010.

(60) Provisional application No. 61/277,334, filed on Sep. 22, 2009.

(51) Int. Cl.
*G06F 17/00* (2006.01)

(52) U.S. Cl. .......... 701/49; 701/31.4; 701/33.8; 701/70; 701/72; 701/83; 701/493; 340/438; 340/439; 340/442; 340/445; 180/167; 180/197

(58) Field of Classification Search .............. 701/31.4, 701/33.8, 49, 70, 72, 83, 84, 91, 493; 303/61, 303/113.1, 115.2, 186, 189, 901; 324/174, 324/207.16, 207.25; 340/438, 439, 442, 340/445; 384/448; 192/223.4; 180/167, 180/197; 310/114, 168; 188/18 A, 71.5; 280/93.512; 73/118.01

See application file for complete search history.

(56) References Cited

U.S. PATENT DOCUMENTS

| | | | | |
|---|---|---|---|---|
| 4,966,034 A | * | 10/1990 | Bock et al. | 73/146.5 |
| 5,612,671 A | * | 3/1997 | Mendez et al. | 340/447 |
| 6,112,587 A | | 9/2000 | Oldenettel | |
| 6,340,930 B1 | * | 1/2002 | Lin | 340/447 |

(Continued)

FOREIGN PATENT DOCUMENTS

EP    0 997 326 A2    5/2000

(Continued)

OTHER PUBLICATIONS

PCT International Search Report and Written Opinion for PCT/US2010/049871, mailing date Dec. 6, 2010.

(Continued)

*Primary Examiner* — James Trammell
*Assistant Examiner* — McDieunel Marc
(74) *Attorney, Agent, or Firm* — Brinks Hofer Gilson & Lione

(57) ABSTRACT

Auto-location systems and methods of tire pressure monitoring sensor units arranged with a wheel of a vehicle detect a predetermined time (T1) when a wheel phase angle reaches angle of interest using a rim mounted or a tire mounted sensor. The systems and methods transmit a radio frequency message associated with a wheel phase angle indication. The wheel phase angle indication triggers wheel phase and/or speed data such as ABS data at the predetermined time (T1) to be stored. A correlation algorithm is executed to identify the specific location of a wheel based on the wheel phase and/or speed data at the predetermined time (T1). TPM sensor parameters from a tire pressure monitoring sensor unit are assigned to the specific location of the wheel.

20 Claims, 23 Drawing Sheets

U.S. PATENT DOCUMENTS

| | | |
|---|---|---|
| 6,435,020 B1 | 8/2002 | Oldenettel et al. |
| 6,486,773 B1 | 11/2002 | Bailie et al. |
| 6,885,293 B2 * | 4/2005 | Okumura ............... 340/448 |
| 6,922,140 B2 | 7/2005 | Hernando et al. |
| 6,988,026 B2 * | 1/2006 | Breed et al. ............. 701/31.4 |
| 7,010,968 B2 | 3/2006 | Stewart et al. |
| 7,053,761 B2 * | 5/2006 | Schofield et al. ......... 340/447 |
| 7,205,886 B2 * | 4/2007 | Kin ........................ 340/442 |
| 7,336,161 B2 | 2/2008 | Walraet |
| 7,362,218 B2 | 4/2008 | McCall et al. |
| 7,367,227 B2 | 5/2008 | Stewart et al. |
| 7,404,427 B2 * | 7/2008 | Hillman et al. ............. 157/1 |
| 8,013,725 B2 * | 9/2011 | Murata et al. ............ 340/447 |
| 2002/0084896 A1 * | 7/2002 | Dixit et al. .............. 340/447 |
| 2004/0257213 A1 * | 12/2004 | Tsujita .................... 340/445 |
| 2005/0068161 A1 * | 3/2005 | Ichinose et al. ........... 340/445 |
| 2011/0071737 A1 * | 3/2011 | Greer et al. ................ 701/49 |
| 2011/0169627 A1 | 7/2011 | Fink ....................... 340/442 |

FOREIGN PATENT DOCUMENTS

| | | |
|---|---|---|
| WO | WO 2010/034703 A1 | 4/2010 |
| WO | WO 2011/085877 A1 | 7/2010 |

OTHER PUBLICATIONS

PCT International Search Report and Written Opinion for PCT/US2011/056823, mailing date Jan. 18, 2012.

* cited by examiner

SYSTEM AND METHOD FOR PERFORMING AUTO-LOCATION OF A TIRE PRESSURE MONITORING SENSOR ARRANGED WITH A VEHICLE WHEEL

PRIORITY

This application is a continuation-in-part of U.S. application Ser. No. 12/888,247 filed Sep. 22, 2010, entitled "System and method for performing auto-location of a wheel in a vehicle using wheel phase angle information," which claims priority to Provisional Application No. 61/277,334 filed on Sep. 22, 2009, entitled "Use of wheel phase angle to perform auto-location in a Tire Pressure Monitoring System." Disclosures of U.S. application Ser. No. 12/888,247 and Provisional Application No. 61/277,334 are incorporated here in their entirety.

BACKGROUND

1. Technical Field

This invention relates generally to a system and method for performing auto-location of a wheel in a vehicle and more particularly to a tire pressure monitoring system and method for performing auto-location of a tire pressure monitoring sensor arranged with a vehicle wheel using wheel phase and/or speed data.

2. Related Art

In tire pressure monitoring systems, performing auto-location of a wheel is needed for a number of reasons. Tire pressure monitoring systems generally include a tire pressure monitoring (TPM) sensor in or at each wheel of a vehicle and a central controller which receives tire pressure information from each TPM sensor, to be reported to the driver of the vehicle. Auto-location is the identification of each TPM sensor and determination of its position on the vehicle, automatically and without human intervention. Auto-location may be done initially upon installation and subsequently in the event of tire rotation or replacement. Performing auto-location involves determining the identity or serial number of a TPM sensor in each of the wheels in the car. In premium vehicles, knowing the identity of the TPM sensor in each wheel allows a pressure by position display to be implemented and shown to the driver. In basic vehicles with different placard tire pressures for front and rear axles, it is desirable to know TPM sensor identities and positions in order to check pressure against a correct threshold for an applicable axle.

SUMMARY

The present embodiments are directed to auto-location systems and methods in which wheel phase and/or speed data is correlated with a specific wheel to determine a location of a TPM sensor and facilitate identification of the TPM sensor arranged with the specific wheel on a vehicle. The present embodiments determine the wheel location in order to determine the location of a TPM sensor arranged with the wheel. In the present embodiments, the auto-location of a wheel indicates auto-location of the TPM sensor arranged with the wheel so that parameters from the TPM sensor may be assigned to the wheel. The wheel phase and/or speed data can be processed and correlated with wheel phase angle information or a wheel phase angle indication from a wheel unit. The present systems and methods are particularly well suited for use with tire pressure monitoring systems that use rim mounted sensors that can deduce the instantaneous wheel angle using shock sensors. Alternatively, or additionally, the present systems and methods can also be practiced in a tire pressure monitoring system that uses a rim mounted sensor which is able to deduce the instantaneous wheel angle using accelerometers. The present systems and methods are also well suited for use with tire pressure monitoring systems that use tire mounted sensors that deduce the instantaneous wheel angle. This method of auto-location is not limited to the use of accelerometric devices. For example, periodic signals from which phase information can be deduced may also be used. Devices such as Hall effect sensors or sensors which respond to road strike may be used to deduce the phase information.

Advantageously, most vehicles employ antilock brake systems ("ABS"). The ABS allows independent wheel speeds to be monitored in near real-time. In one embodiment, the wheel phase and/or speed data includes or is based on the ABS data. Correlation between ABS data and other data from TPM sensors can be used to locate wheel positions where the TPM sensors are arranged. ABS sensors provide the ABS data and may be associated with one or more wheels. As one example, ABS sensors are associated with each wheel of a vehicle, or with selected wheels of the vehicle. The wheel phase and/or speed data is not limited to the ABS data. A sensor, a device, a system, or a mechanism that may provide wheel phase and/or speed data directly or in various forms may be used in addition to, or instead of antilock brake systems.

In one embodiment, the identification of the wheel location, thereby identifying the location of the TPM sensor, may require snapshots of information at a one-measurement point during rotation of a wheel, where a snapshot is a capture of information from a short duration of a continuous stream of information. A radio frequency (RF) transmission identifying the one-measurement point is transmitted from a wheel unit and correlated to the ABS data at the one-measurement point using a statistical processing method. A historic trace of the ABS data at the one-measurement point is correlated to a specific wheel location.

By way of one example, one embodiment of a wheel auto-location method includes (i) arranging a wheel unit to be associated with a wheel of the vehicle, the wheel unit comprising a TPM sensor and a wheel phase angle sensor and the wheel unit transmitting TPM sensor parameters; and (ii) arranging an ABS sensor to be associated with each wheel of the vehicle, the ABS sensor producing ABS data indicative of the wheel phase angle. The ABS sensor provides wheel phase and/or speed data in this embodiment; however, the wheel phase and/or speed data is not limited to ABS data. In this embodiment, the wheel auto-location method detects a first time (T1) reaching a particular wheel angle of interest and transmits a radio frequency (RF) message at a second time (T2). A wheel phase angle at the second time (T2) may not be measured. The wheel auto-location method then triggers a phase correlation data storage event based on wheel phase angle indication. In response to the wheel phase angle indication, the phase correlation data storage event is triggered and the current contents of a rolling window of the ABS data is captured. The rolling window of the ABS data is continuously maintained and the captured current content of the rolling window is stored in storage. After a substantial amount of the ABS data is captured, an auto-location algorithm is executed and applied to the stored ABS data in order to identify a specific location of the wheel.

The phase correlation data storage event trigger is implemented with various embodiments of the wheel phase angle indication. In one embodiment, the wheel phase angle indication includes a function code, or a status code contained in the RF message. Upon receipt of such RF message, the phase correlation data storage event is triggered and the current content of the rolling window of the ABS data is captured. In another embodiment, the RF message uses at least a portion of bits of a temperature data field of the RF message as the wheel phase angle indication. The temperature data bits are recognized and the current content of relevant ABS data is captured. Further in another embodiment, interframe spacings of a series of RF messages operate as the wheel phase angle indication. The interframe spacings are recognized and the relevant ABS data is captured.

Another embodiment of the present invention includes a wheel auto-location system that determines a location of a TPM sensor. The system includes a wheel unit to be associated with a wheel of the vehicle. The wheel unit includes the TPM sensor that measures tire pressure of the wheel and a wheel phase angle sensor that detects a first time (T1) when a wheel phase angle reaches a particular angle of interest. The wheel unit transmits an RF message at the second time (T2). The RF message includes an identification of the TPM sensor and measured tire parameters such as tire pressure. The RF message may not include an actual phase angle. Alternatively, or additionally, the RF message includes position or location information of the TPM sensor such as left side or right side of a vehicle.

In this embodiment, the wheel auto-location system further may include or may work in cooperation with an antilock brake system ("ABS") sensor associated with each wheel of the vehicle and operable to provide ABS data indicative of the wheel phase angle. The ABS data may be used as wheel phase and/or speed data, but other data that represents wheel phase and/or speed is available. The wheel auto-location system further includes or operates in conjunction with an Electronic Control Unit ("ECU") in communication with the wheel unit and the ABS sensor. ABS data from the ABS sensors are available to other components of the vehicle such as the wheel auto-location system and the ECU. The ECU may be operable to execute instructions of calculating the first time (T1) based on a predetermined time delay, determining the ABS data at the calculated first time (T1) and identifying a location of the wheel whose ABS data matches with a predetermined criterion.

In one embodiment, the predetermined criterion is based on a historic trace of the ABS data at the first time (T1). The predetermined criterion is also based on a statistically significant value of the ABS data. For example, the ECU correlates the location of the wheel having the TPM sensor with the location of the ABS sensor whose historic trace shows a lowest standard deviation of ABS tooth count values at the first time (T1) over time. Alternatively, or additionally, the ECU correlates the location of the wheel having the TPM sensor with the location of the ABS sensor whose historic trace shows the most consistent ABS tooth count values at the first time (T1) over time. Alternatively, or additionally, the ECU correlates the location of the wheel having the TPM sensor with the location of the ABS sensor whose historic trace shows a statistically significant trend in ABS tooth count values at the first time (T1) over time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification and in which like numerals designate like parts, illustrate embodiments of the present invention and together with the description, serve to explain the principles of the invention. In the drawings.

DETAILED DESCRIPTION

The present invention is directed to systems and methods in which a measurement from a wheel is combined or correlated with wheel phase and/or speed data such as antilock brake system (ABS) data to allow identification of the TPM sensors to a specific location on a vehicle. In accordance with various embodiments of the present invention, a tire pressure monitoring system comprises wheel rim or tire mounted TPM sensors, typically four, and an Electronic Control unit (ECU) that receives signals from the TPM sensors. In addition, the system employs data presented to the ECU from the Anti-lock Brake System (ABS).

In accordance with various embodiments of the present invention, the identification of the TPM sensors may require snapshots of information at one-measurement point during a rotation of a wheel, where a snapshot is a capture of information from a short duration of a continuous stream of information. The ECU holds a rolling window of ABS data for all wheels or selected wheels associated with ABS sensors. When a radio frequency (RF) data frame is received, the ECU uses the RF data frame to store and determine relevant ABS data from the rolling window of the ABS data. An auto-location algorithm is applied to stored ABS data to identify a specific location of a wheel where a TPM sensor is arranged. The auto-location algorithm may analyze a historic trace of the ABS data and determines a standard deviation of ABS tooth count values with respect to each wheel of a vehicle. Alternatively, or additionally, the auto-location algorithm may analyze a statistically significant trend of the ABS data.

Figure 1:
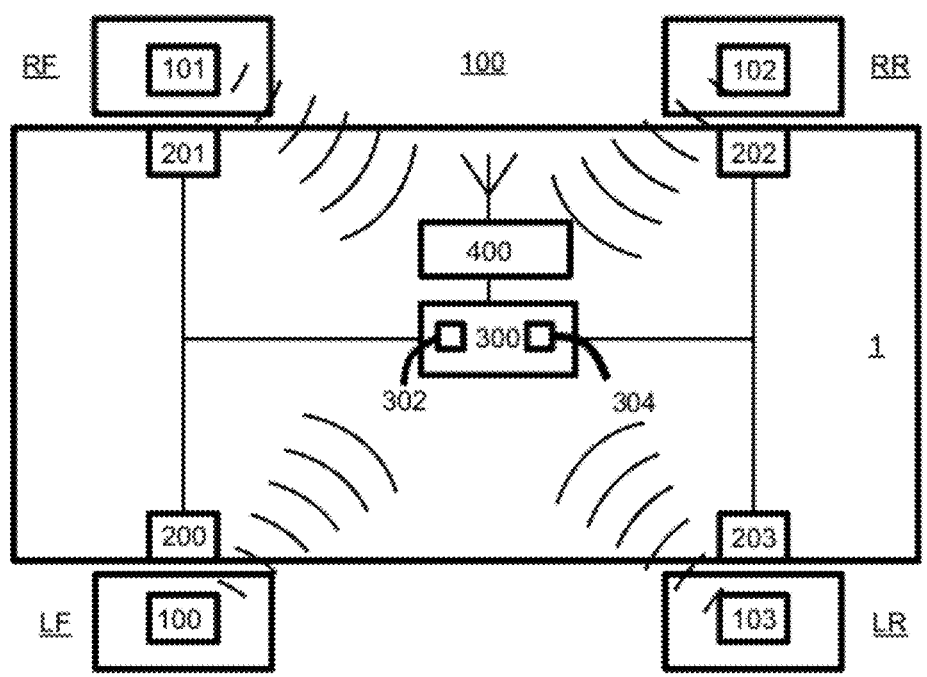
FIG. 1 illustrates one embodiment of a tire pressure monitoring system.

FIG. 1 illustrates a tire pressure monitoring system 100 according to a first embodiment of the present invention. The system 100 is arranged in a standard vehicle 1 having four wheels. Four wheels include a left front wheel (LF), a right front wheel (RF), a left rear wheel (LR) and a right rear wheel (RR). In another embodiment, the system 100 may be arranged in any other vehicle having a different number of wheels. The system 100 includes wheel units 101, 102, 103 and 104 that are associated with each wheel of the vehicle 1.

The system 100 further includes four antilock brake system (ABS) sensors 201, 202, 203 and 204. In this embodiment, ABS sensors 201, 202, 203, 204 are also associated with each wheel of the vehicle 1. Accordingly, each wheel is assigned with one of the wheel units 101, 102, 103 and 104 and one of ABS sensors 201, 202, 203 and 204. In another embodiment, ABS sensors 201, 202, 203, 204 may not be associated with all four wheels. Fewer numbers of ABS sensors may be present in a structure of a vehicle such as a single axle and associated with a few selected wheels.

The system 100 also includes an Electronic Control Unit (ECU) 300 and a receiver 400. The ECU 300 is coupled to the ABS sensors 201, 202, 203, 204 via a communication bus such as a Controller Area Network (CAN) bus and receives ABS data from the ABS sensors 201, 202, 203, 204. The ECU 300 includes a processor 302 and-storage 304. The ECU 300 operates to store received ABS data in the storage 304 to provide a historic ABS trace. The ECU 300 may be implemented by any suitable means, for example a microprocessor, microcontroller, an Application Specific Integrated Circuit (ASIC), or other suitable data processing device programmed to perform the functions described herein. Further, the ECU 300 may communicate with other vehicle components using any other suitable device, either wire line or wireless. The CAN bus is an exemplary implementation of data communication among components of the vehicle. The ECU 300 stores computer program code. In one embodiment, the ECU 300 executes the computer program including instructions of calculating a first time (T1) based on a predetermined time delay (T2−T1), storing ABS data indicative of a wheel phase angle based on a phase correlation data storage event trigger and determining the ABS data at the first time (T1), and correlating a location of the wheel with a location of the ABS sensor based on a historic trace of the ABS data at the first time (T1).

The ECU 300 also receives data from the wheel units 101, 102, 103 and 104 via the receiver 400. For example, the wheel units 101, 102, 103 and 104 transmit radio frequency or other wireless communications conveying data and other information to the ECU 300. The respective wheel units include a suitable radio transmission circuit and the ECU 300 includes a suitable radio reception circuit for radio communication. Further, the radio circuits may use an agreed upon transmission and reception format and data encoding technique. The ECU 300 operates to correlate the data received from the wheel units 101, 102, 103 and 104 with the ABS data in order to perform auto-location, as will be discussed in detail below.

Figure 2:
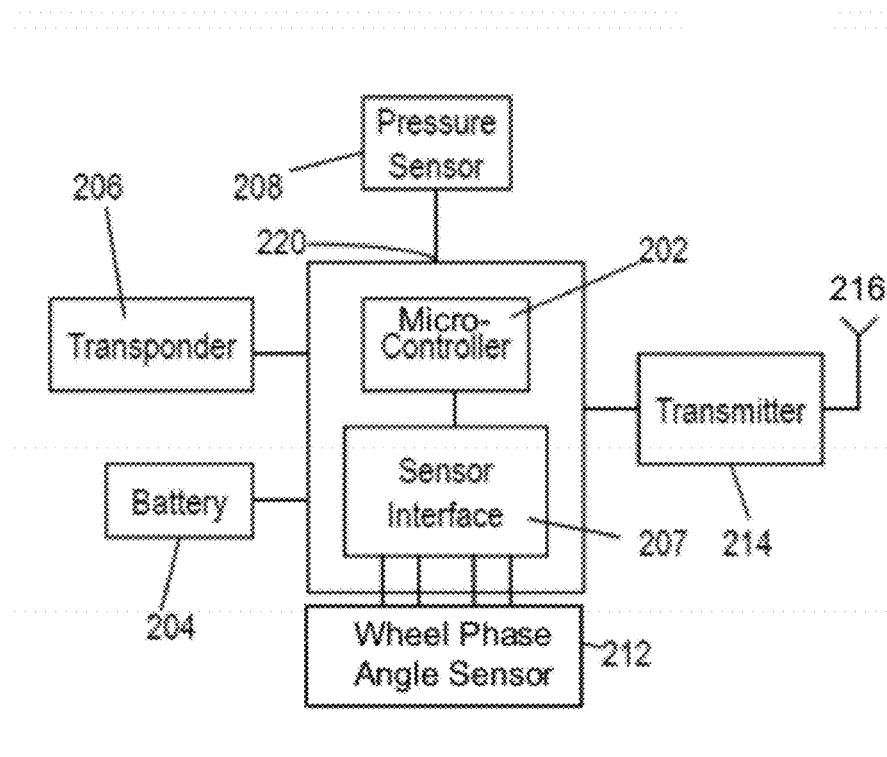
FIG. 2 illustrates one embodiment of a wheel unit for use with the tire pressure monitoring system.

Referring to FIG. 2, the structure of the wheel unit 101 is illustrated in more detail. The wheel units 102-104 may incorporate the same structure as that of the wheel unit 101. As shown in FIG. 2, the wheel unit 101 includes a microcontroller 202, a battery 204, a transponder coil 206, a sensor interface 207, a pressure sensor 208, a wheel phase angle sensor 212, a transmitter 214 and an antenna 216. In other embodiments, the wheel unit 101 may have a different structure from the structure illustrated in FIG. 2. The microcontroller 202 is coupled to the sensor interface 207. The sensor interface 207 is coupled to the wheel phase angle sensor 212. In one embodiment, the wheel phase angle sensor 212 measures a wheel phase angle at multiple different times. The wheel phase angle sensor 212 provides measurements to the sensor interface 207. Alternatively, or additionally, the wheel phase angle sensor 212 provides other value or information indicative of wheel phase angle measurements. The sensor interface 207 receives the measurements of the wheel phase angle sensor 212 in the form of an electrical output signal. The sensor interface 207 receives the electrical output signal and amplifies and filters the signal. The sensor interface 207 sends the processed signal to an analog to digital converter (not shown) in order to convert the signal into a digital signal. The microcontroller 202 receives the digital form of the output signal from the wheel phase angle sensor 212 for processing.

In the illustrated embodiment, the pressure sensor 208 detects the pneumatic air pressure of the tire with which the wheel unit 101 is associated. In alternative embodiments, the pressure sensor 208 may be supplemented with or replaced by a temperature sensor or other devices for detecting tire data. An indication of the tire pressure data is sent to the microcontroller 202 via the analog-to-digital converter (not shown).

The battery 204 is a power source of the wheel unit 101. The transponder coil 206 detects external activation of the transponder by a signal applied by a remote exciter and may modulate a signal to communicate data to a remote detector from the wheel unit 101. The wheel unit 101 provides data including tire pressure from the pressure sensor 208 and the wheel phase angle information from the wheel phase angle sensor 212 through the transmitter 214 and the antenna 216 to the ECU 300 (see FIG. 1).

Upon rotation of a wheel, the wheel phase angle sensor 212 operates to measure a wheel phase angle. The wheel phase angle measurements may not have to be against an absolute reference. The reference may be arbitrarily selected based on accuracy capability and ease of implementation. In other words, the phase measurements do not have to be measured from a top of wheel, or road striking point. In this embodiment, the key piece of information may be a phase difference, or a phase delta of the wheel, and therefore, the requirement is that two different phase angles are measured relative to the same angle. Alternatively, or additionally, in another embodiment, the key piece of information may include a one-measurement point during a rotation of a wheel.

The wheel phase angle sensor 212 may be mounted on a rim of the wheel, or a tire mounted sensor. Alternatively, or additionally, the wheel phase angle sensor 212 may be arranged on any suitable location associated with a wheel. In one embodiment, the wheel phase angle 212 includes a rotation sensor. For example, the rotation sensor may be a piezoelectric rotation sensor which measures a wheel phase angle based on the gravitational force. Specifically, as the wheel rotates, the gravitational force causes a sensing element of the rotation sensor to experience different forces which results in a different output signal representing a wheel phase angle or wheel angular position. In that way, the rotation sensor produces an output signal indicating a wheel phase angle at a predetermined time. The output signal of the rotation sensor may have different amplitude and/or different polarity depending on the wheel phase angle. For instance, the rotation sensor produces the output signal having amplitude M at 0 degree and having the amplitude −M at 180 degree. Alternatively, or additionally, any conventional rotation sensor may be used as the wheel phase angle sensor 212.

In another embodiment, the wheel phase angle sensor 212 comprises a shock sensor of the type that produces an electrical signal in response to acceleration. The electrical signal is indicative of, or typically proportional to, the experienced change in acceleration. Alternatively, the wheel phase angle sensor 212 may each comprise an accelerometer or a microelectromechanical systems (MEMs) sensor. The main difference between an accelerometer and a shock sensor is that the output signal from a shock sensor is related to a change of force applied to the shock sensor, whereas the output signal from an accelerometer is proportional to the absolute force applied. Shock sensors may be implemented, for example, with shock sensors discussed in commonly owned U.S. Pat. No. 7,362,218, issued Apr. 22, 2008 and entitled Motion Detection Using A Shock Sensor In A Remote Tire Pressure Monitor System and commonly owned U.S. Pat. No. 7,367, 227, issued May 6, 2008 and entitled Determination Of Wheel Sensor Position Using Shock Sensors And A Wireless Solution, the disclosures of which are incorporated here in its entirety. Accelerometer sensors may be implemented, for example, with sensors discussed in commonly owned U.S. Pat. No. 7,010,968, issued Mar. 14, 2006 and entitled Determination Of Wheel Sensor Position Using A Wireless Solution, the disclosure of which is incorporated here in its entirety.

Figure 3A:
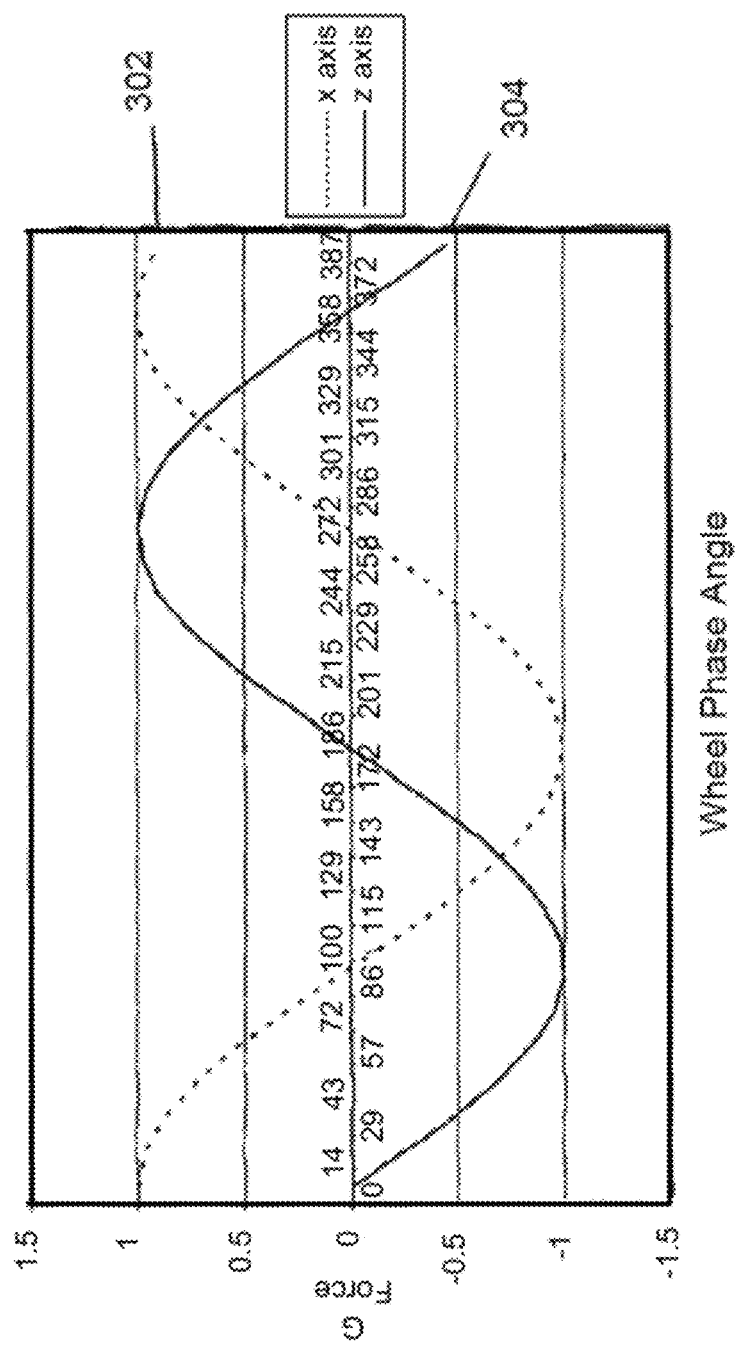
FIG. 3A illustrate a wheel phase angle as a function of the gravitational force, i.e., acceleration

In the embodiment where shock sensors or accelerometers are used as the wheel phase angle sensor 212, FIG. 3A is a graph illustrating a wheel phase angle or a wheel angular position as a function of the gravitational force or acceleration. In the illustrated embodiment, the wheel rotates counter clockwise, and acceleration along the z axis 304 leads acceleration along the x axis by approximately 90 degrees. The output signal is a sinusoid with a period equal to one revolution of the wheel. The magnitude of the output signal is a voltage proportional to the change in acceleration or acceleration experienced by the wheel phase angle sensor 212 such as the shock sensors or accelerometers as they rotate. The graph as shown in FIG. 3A is by way of example, and the actual acceleration experienced in a moving wheel may be different from the amount illustrated in FIG. 3A.

Figure 3B:
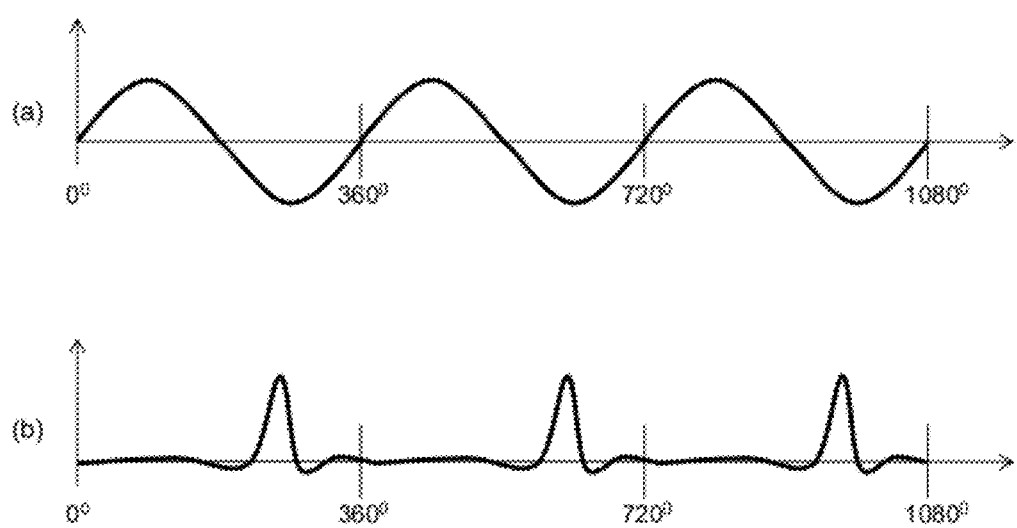
FIG. 3B illustrates phase varying signals from different sensors.

FIG. 3B(a) illustrates phase varying signals output from the wheel phase angle sensor 212 which may be a shock sensor or an accelerometer. FIG. 3B(b) illustrates phase varying signals output from the wheel phase angle sensor 212 which may be a Hall effect sensor, or a road striking sensor. The phase varying signals illustrated in FIGS. 3B (a) and (b) are input to the microcontroller 202. The microcontroller 202 recognizes a repeated pattern in the phase varying signals and determines one rotation of the wheel. Then, the microcontroller 202 determines how far through the one rotation of the wheel it is at the first time (T1) and the second time (T2) and determines a first phase angle (P1) and a second phase angle (P2). Assuming that the phase-varying signal does not change its characteristics between the first time (T1) and the second time (T2), the first phase angle (P1) and the second phase angle (P2) will be relative to each other, and can be used as auto-location data.

Referring back to FIG. 2, the sensor interface 207 is configured to provide the necessary control signals and detect the electrical signals from the wheel phase angle sensor 212 such as the shock sensor. As discussed above, the shock sensor detects change in acceleration to produce an output in the form of an electrical charge output signal. The output signal is typically in the order of 1 mV/g. Preferably, if the wheel phase angle sensor 212 includes more than one shock sensor, shock sensors can share the same interface 207 via multiplexing.

Through the sensor interface 207, the microcontroller 202 receives output signals representing wheel phase angle from the wheel phase angle sensor 212. The microcontroller 202 may include, for example a memory for data storage and a data processing unit. The microcontroller 202 stores a received wheel phase angle, or data related thereto, for a later transmission to the ECU 300. The microcontroller 202 may not transmit every time the output signal has been received. In one embodiment, the microcontroller 202 calculates and determines a difference in two wheel phase angles measured by the wheel phase angle sensor 212. For instance, the microcontroller 202 subtracts a first wheel phase angle measured at a first time (T1) from a second wheel phase measured at a second time (T2). In another embodiment, the microcontroller 202 determines the second time (T2) based on a predetermined known time delay (T2−T1). For instance, the microcontroller 202 may consider the first time (T1) as the one-measurement point of a wheel phase angle during the rotation of a wheel and the second time (T2) as a data transmission point of a radio frequency message as described below. The microcontroller 202 may include a clock or time base, or other circuit or module for measuring time increments and operating at specified times or during specified time durations.

The microcontroller 202 encodes and transmits a radio frequency message via the transmitter 214 and the antenna 216. The radio frequency message includes, among other things, tire pressure information, an identifier of the wheel unit 101, and wheel phase angle information. The wheel phase angle information may include actual wheel phase angles measured at different times. In another embodiment, the wheel phase angle information may include wheel phase angle measured at a transmission time, such as the second time (T2), and a difference in wheel phase angle measured at two different times. Alternatively, the wheel phase angle information may include only the difference in wheel phase angles.

In another embodiment, the wheel phase angle information may include no actual wheel phase angle. Instead, the wheel phase angle information includes a wheel phase angle indication. As one example, the wheel phase angle indication may include a predefined function code which will trigger a phase correlation data storage event. The wheel phase angle indication may be implemented by establishing predetermined data values or patterns such as by setting a bit which is normally unused in a RF message structure (see FIG. 11A). Alternatively, or additionally, the wheel phase angle indication may be implemented with a most significant bit, which is normally set to zero (see FIG. 11B). Additionally, the phase wheel angle indication may also include a predetermined time delay, such as T2−T1, or any other information indicative of a wheel phase angle (e.g., a pseudo-random number).

Referring again back to FIG. 1, the ECU 300 receives the radio frequency message from the wheel unit 201. The ECU 300 stores the radio frequency message, or data contained in the radio frequency message. Such data may be stored in the storage 304 which is a suitable data store such as a memory device. Also, the ECU 300 extracts the tire pressure, the identifier, and the wheel phase angle information from the radio frequency message. The ECU 300 correlates the wheel phase angle information with the ABS data from the ABS sensors 201, 202, 203, 204. In one embodiment, the ECU 300 analyzes the ABS data and determines a wheel phase angle or a wheel phase angle difference which is indicated by and corresponds to the ABS data. The ECU 300 compares the wheel phase angle information from the wheel unit 101 with the wheel phase angle or the wheel phase angle difference of the ABS data in order to determine the closest match. Upon finding the closest match, the ECU 300 assigns the identifier sent from the wheel unit 101 to a wheel whose ABS data most closely matches with the wheel phase angle information from the wheel units 101, 102, 103, 104.

In another embodiment, the ECU 300 analyzes the ABS data and determines whether the ABS data maintains a consistent value or a statistically significant trend at a predetermined time (e.g., T1). Alternatively, or additionally, the ECU 300 analyzes the ABS data and determines whether the ABS data shows a lowest standard deviation for a particular wheel location. By using this statistical correlation method, as will be described in detail below, the ECU assigns the identifier sent from the wheel unit 101 to a wheel whose ABS data is the most consistent or shows the lowest deviation, or shows the a statistically significant trend.

Figure 4:
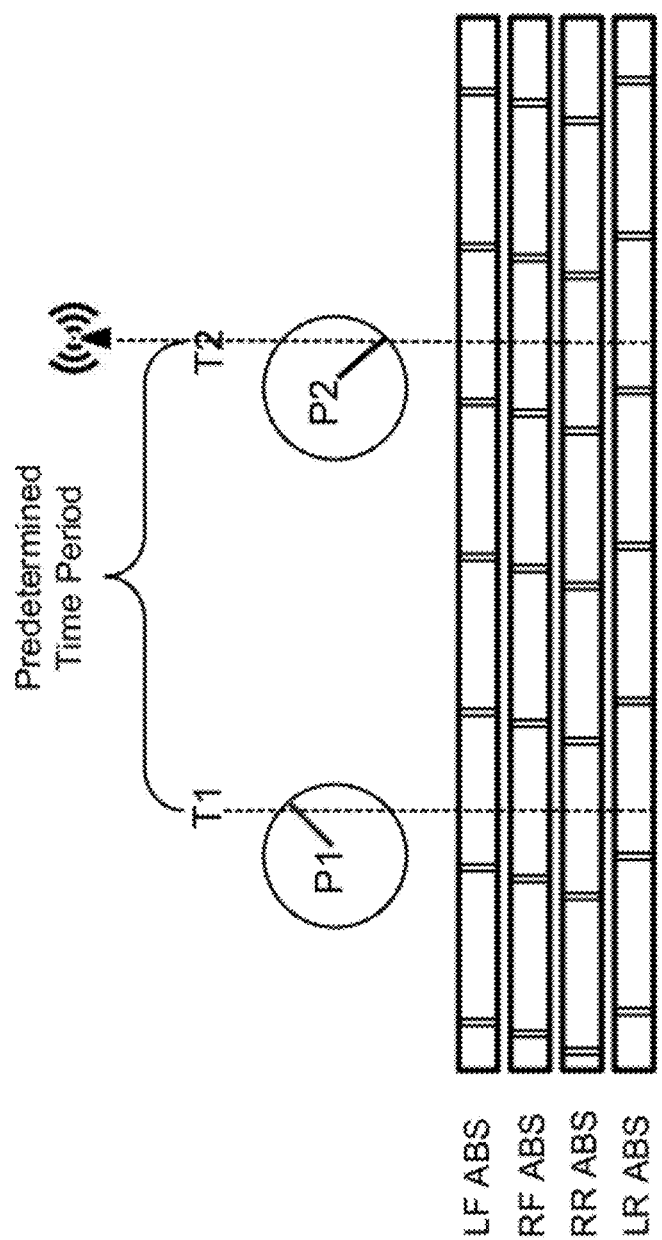
FIG. 4 illustrates one embodiment of correlation between wheel phase angle information from the wheel unit and ABS data.

Referring to FIG. 4, correlation of the wheel phase angle information from the wheel unit 101, 102, 103, 104 with the ABS data is further explained. In one embodiment, the wheel phase angle sensor 212 measures a wheel phase angle multiple times. In another embodiment, the wheel phase angle sensor 212 measures a wheel phase angle at the one-measurement point (e.g., T1 in FIG. 4) and does not measure the wheel phase angle at a different time (e.g., T2 in FIG. 4). In this embodiment, the wheel phase angle sensor 212 measures a first wheel phase angle (P1) at a first time (T1) and waits a predetermined time. The wheel phase angle sensor 212 then transmits a radio frequency message at a second time (T2) where T2=T1+Predetermined Time. The method with which the time T2−T1 is predetermined will be discussed later. Alternatively, the wheel phase angle sensor 212 measures the first wheel phase angle (P1) and detects the first time (T1) when the wheel phase angle reaches the first wheel phase angle (P1), which will be further described later. In this embodiment, the wheel units 101, 102, 103, 104 may be pre-programmed to recognize this Predetermined Time. For example, in a tire mounted TPM sensor the act of "striking" the ground provides an indication that the tire sensor has completed a revolution, relative to a previous "strike." If the TPM sensor reports the time since the last strike, then the phase of the wheel can be deduced. It may also be desirable, although not essential, that the period of the wheel revolution may also be sent.

In one embodiment, the Predetermined Time (T2−T1) may be fixed and selected to ensure multiple wheel rotations between the first time (T1) and the second time (T2). In case the difference in wheel speed between vehicle wheels may be small, setting the value of the Predetermined Time (T2−T1) to cover multiple wheel rotations may improve accuracy of the auto-location. Accordingly, a tire pressure monitoring system according to this embodiment may sufficiently comply with accuracy requirements. Alternatively, in another embodiment, a period between the first time and the second time (T1, T2) may be variable, whereas a phase angle difference or a phase delta may be fixed. This embodiment will be further explained in detail below.

As discussed in connection with FIG. 2 above, the microcontroller 202 calculates and determines a wheel phase angle difference (PD) by subtracting the second wheel phase angle (P2) from the first wheel phase angle (P1). The wheel phase angle difference (PD) may range between 0 degree and 360 degree. In this embodiment, the wheel units 101, 102, 103, 104 may transmit a radio frequency message including the wheel phase angle difference to the ECU 300. The wheel units 101, 102, 103, 104 may transmit the radio frequency message at a time that the wheel phase angle difference (PD) is obtained, i.e., the second time (T2). Because the wheel units 101, 102, 103, 104 provide the wheel phase angle difference (PD), the ECU 300 may reduce the burden of calculating the wheel phase angle difference. Tire pressure monitoring systems are time-critical applications, and additional time to process the calculation of the wheel phase angle difference (PD) may introduce uncertainty and increase inaccuracy.

As shown in FIG. 1, the ECU 300 periodically receives ABS data from the ABS sensors 201, 202, 203, 204. Additionally, the vehicle may include an Electronic Stability Control (ESC) system which may be the source of other inputs, such as steering angle, vehicle yaw, etc. to the ABS system information to help control vehicle progress through curves in the road. For instance, the ECU 300 receives the ABS data every 40 ms. As shown in FIG. 4, a rolling window of ABS data is stored, running from the present point to a point in the past. In this embodiment, the rolling window of the ABS data is stored for each wheel throughout the entire drive. The rolling window of the ABS data is variable and large enough to contain the first time (T1). The stored ABS data provides a historic ABS trace between the first time (T1) and the second time (T2). The ABS data includes information that is used to measure a phase through which the wheel has rotated. In one embodiment, the ABS data may include a number of ABS teeth that pass through the ABS sensors 201, 202, 203, 204 during a predetermined period of time. Only as one example, 48 teeth pass through the ABS sensor 210, which indicates completion of a full cycle. The ABS data for the number of counts may be divided by the number of teeth per wheel which is constant. The remainder of the number of counts divided by the number of teeth gives an estimate of wheel angle change over any given period. Using the above example of 48 teeth, 48/48=1 and the remainder is zero. Accordingly, the ECU 300 determines that there is no wheel phase angle change.

As shown in FIG. 4, the first time (T1) and the second time (T2) may serve as time points at which correlation of wheel phase angles (P1, P2) with ABS data shall occur. The time delay or the time period between the first time (T1) and the second time (T2) may be predetermined in order to ensure generation of effective phase angle data and ABS data that result in accurate auto-location. The time delay or the time period between the first time (T1) and the second time (T2) may be known to the ECU 300 and the wheel units 101-104 such that the first time (T1), the second time (T2), the first phase angle (P1), etc. may be later calculated and determined. Alternatively, in another embodiment, the time period between the first time (T1) and the second time (T2) may be variable.

Figure 5:
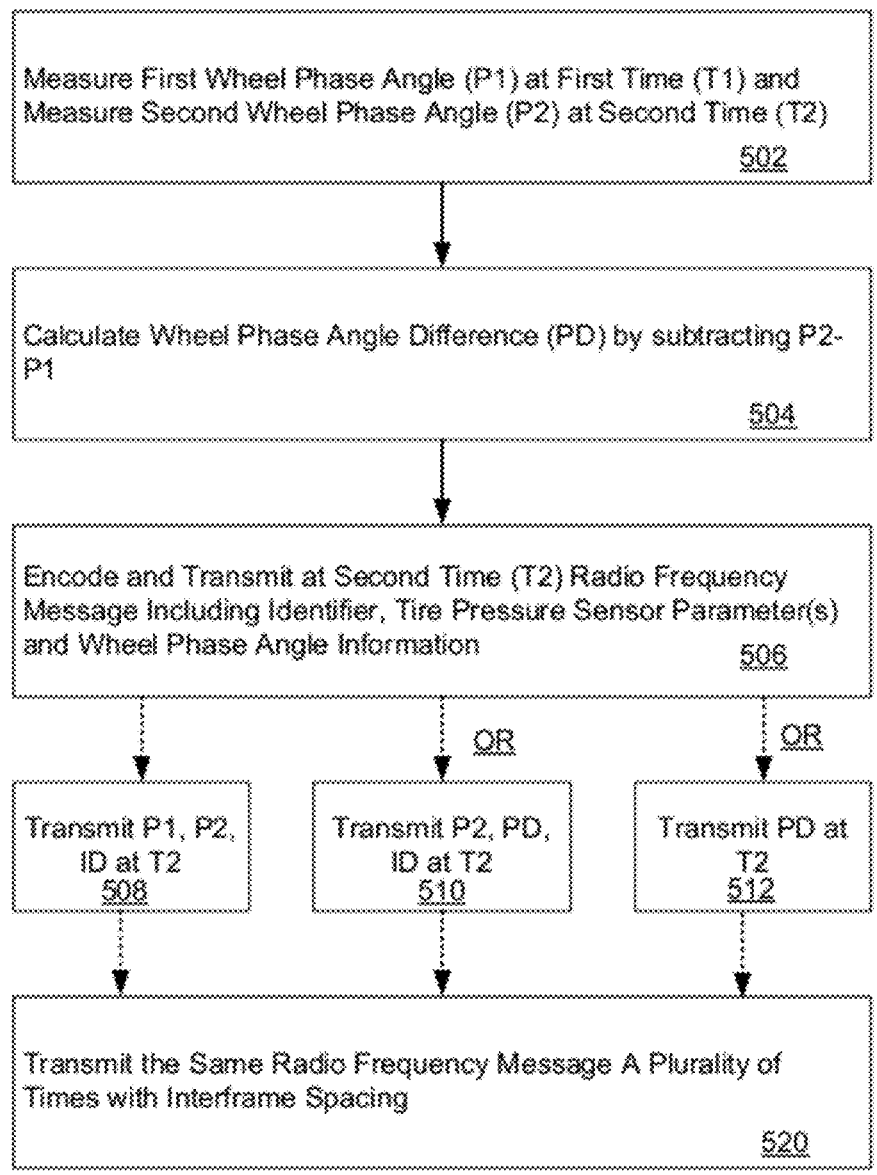
FIG. 5 is a flow chart illustrating one embodiment of a method for performing auto-location of a wheel using wheel phase angle information at the wheel unit.

Referring to FIGS. 5-8, a method for performing auto-location of a wheel using wheel phase angle information is explained in detail. FIG. 5 is a flow chart illustrating one embodiment of a method for performing auto-location of a wheel using wheel phase angle information. In particular, FIG. 5 shows operations at the wheel unit 101 for convenience. The operations at the wheel unit 101 may be equally applicable to the wheel units 102, 103, 104. In the embodiment illustrated in FIG. 5, the time period between the first time (T1) and the second time (T2) is pre-determined, whereas a phase angle difference between the first phase angle (P1) and the second phase angle (P2) is variable.

As shown in FIG. 5, at the wheel unit 101, the first wheel phase angle (P1) is measured at the first time (T1) and the second wheel phase angle (P2) is measured at the second time (T2) after passage of the predetermined time (Step 502). At the wheel unit 101, the wheel phase angle difference (PD) is calculated by subtracting P1 from P2 (Step 504). The microcontroller 202 generates the radio frequency message including tire pressure, the identifier of the TPM sensor 208, and the wheel phase angle information. The radio frequency message is transmitted via the transmitter 214 and the antenna 216 (Step 506). The radio frequency message is transmitted a plurality of times (e.g., 5 times or 8 times) to ensure that the ECU 300 receives the message, considering clashing and path loss. Thus, interframe spacing may be introduced to avoid clashing, which occurs when two transmitters transmit at the same time so as to be indistinguishable to the receiver. (Step 520). The same wheel phase angle information is duplicated in each frame 1 to 8. If the first frame of data is not received, then the ECU 300 must be able to calculate the time at which frame 1 was transmitted in order for the wheel phase angle data to be accurate (Step 520). Therefore, the transmitted frames which contain the wheel phase angle information need a predetermined interframe spacing known to the ECU 300. The frames may be numbered 1 through 8, or alternatively, the frame number information could be deduced by the ECU from the interframe spacing.

In one embodiment, the wheel phase angle information includes the first wheel phase angle (P1) and the second wheel phase angle (P2). The wheel unit transmits the first and the second wheel angles (P1 and P2) at the second time (T2) (Step 508). In another embodiment, the wheel phase angle information includes the second wheel phase angle (P2) and the wheel phase angle difference (PD) which is transmitted at the second time (T2) (Step 510). In further another embodiment, the wheel phase angle information includes only the wheel phase angle difference (PD) (Step 512).

Figure 6:
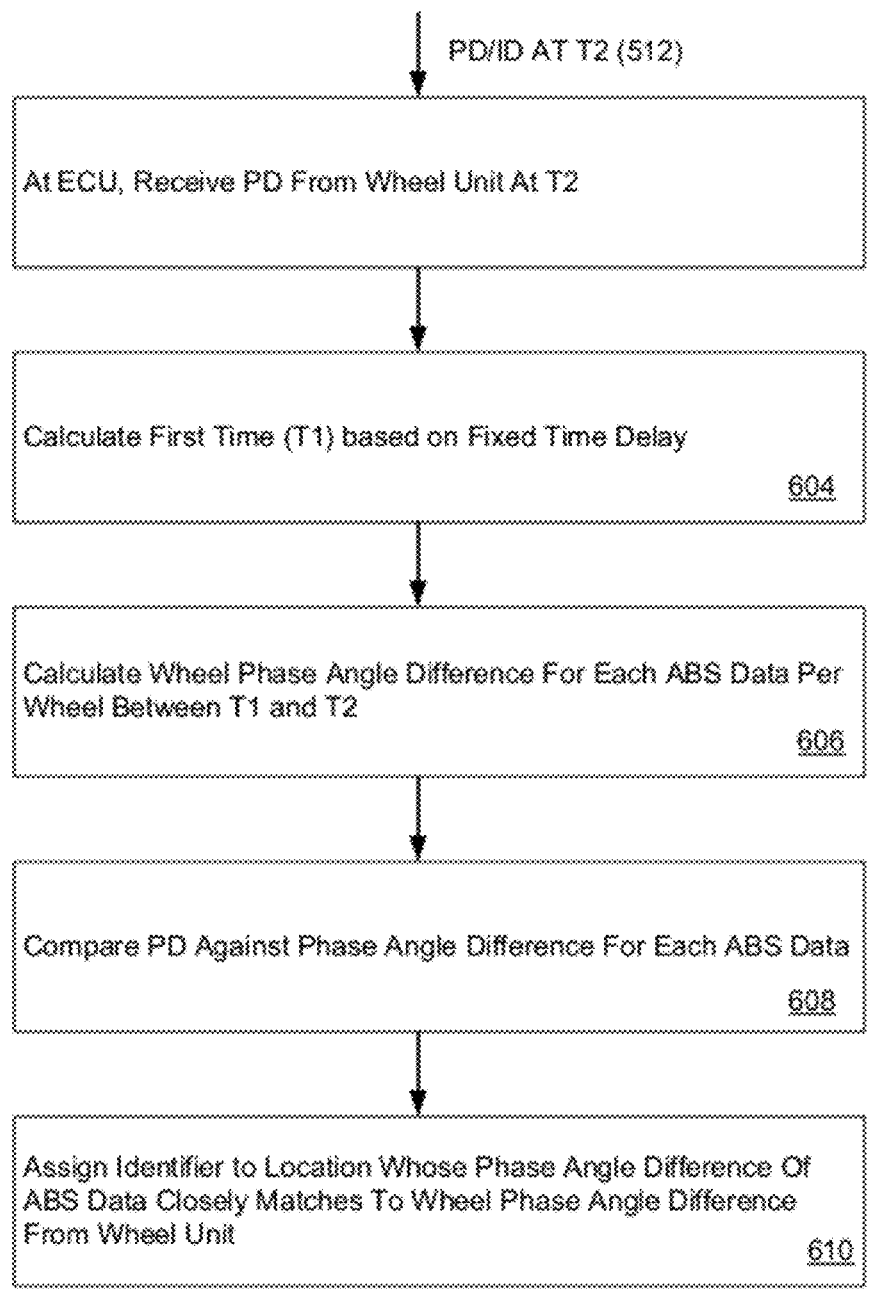
FIG. 6 is a flow chart further illustrating the method for performing auto-location of the wheel at an Electronic Control Unit ("ECU").

FIG. 6 is a flow chart illustrating one embodiment of the method for performing auto-location of the wheel using wheel phase angle information at the ECU 300. In the illustrated embodiment, the wheel phase angle difference (PD) is received at the second time (T2) (Step 602 and Step 512). Here it is assumed that the ECU 300 has received the first frame. The ECU 300 calculates the first time (T1) based on the fixed time delay which is known to the ECU 300 (Step 604). The first time (T1) may need calculation to give a reference point at which the ABS data will be analyzed. As noted above, the period between the first time (T1) and the second time (T2) is set up to ensure that a meaningful phase angle difference between the measured phase angles can be obtained.

After determining the first time (T1), the ECU 300 is able to calculate a phase angle difference for each ABS data per wheel between T1 and T2 (Step 606). Using the example discussed above, 48 teeth of ABS teeth that have passed the period between T1 and T2 may indicate two full rotations of the wheel and the zero remainder of 48 teeth/24 teeth indicates zero phase angle difference. The ECU 300 compares the wheel phase angle difference (PD) against the phase angle difference for each ABS data (Step 608). In other words, the ECU may estimate, by interpolation of the RF message phase measurement, what the number of counts from each ABS sensor would have been and search for a match from the ABS data for a wheel unit that has a similar wheel angle. The purpose of the correlation is to determine which set of ABS data matches with the deduced phase rotation of the wheel phase angle sensor 212.

There are a number of ways to perform the interpolation. For example, linear interpolation based on the assumption that the vehicle speed is relatively constant may be used. For example, every wheel on the vehicle will rotate at least 0.1% difference in overall effective circumference. After 60 seconds at 40 kmh (typically 5.5 Hz), the difference in angular rotation of each wheel will likely be 0.001*5.5*60. This equates to ⅓ of a revolution or 120 degrees. As a result, the ECU 300 assigns the identifier to a location whose phase angle difference of ABS data mostly closely matches to the wheel phase angle difference transmitted from the wheel unit 101.

Figure 7:
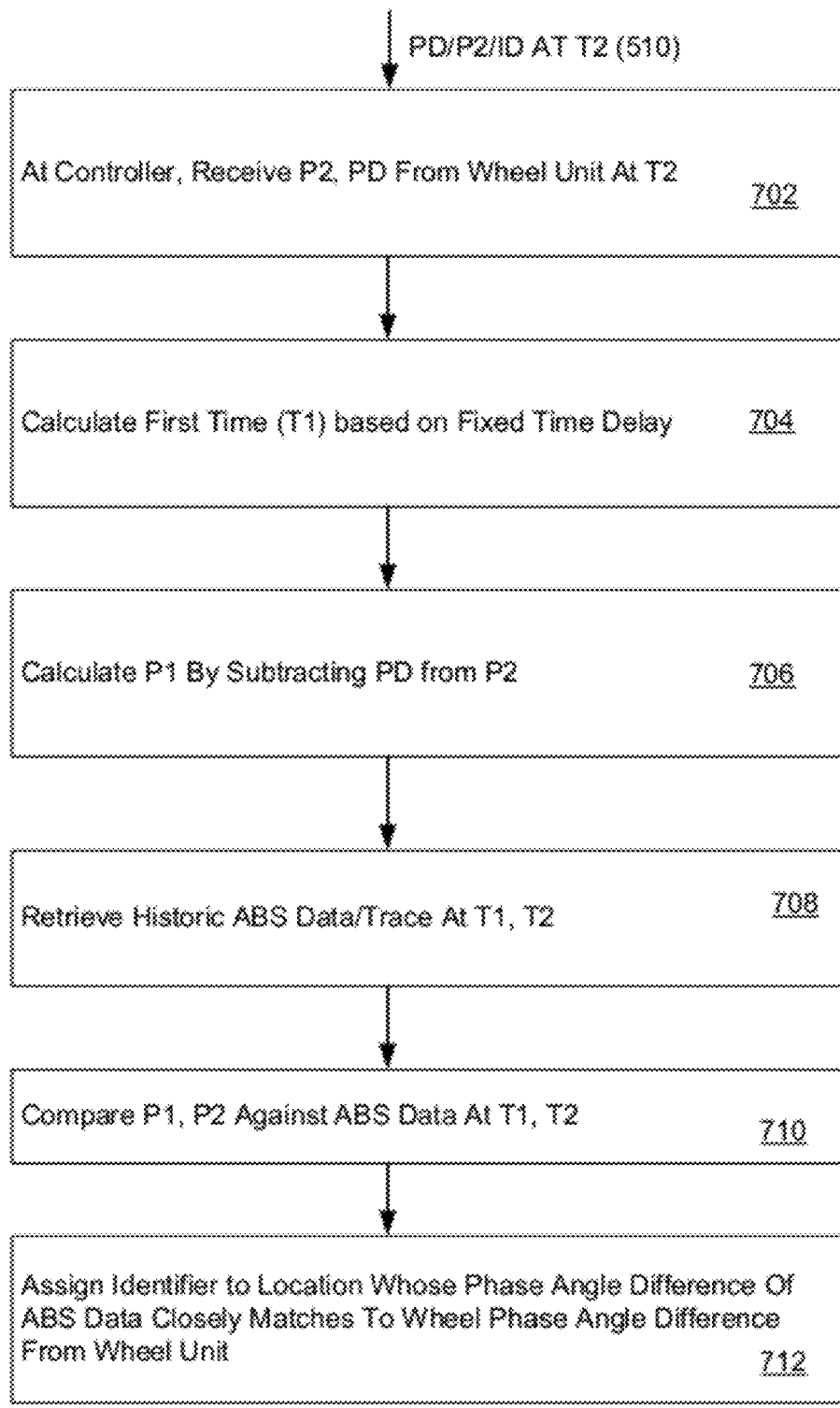
FIG. 7 is a flow chart illustrating another embodiment of the method for performing auto-location of the wheel using wheel phase angle information.

FIG. 7 is a flow chart illustrating another embodiment of the auto-location method. In the illustrated embodiment, the wheel phase angle (P2) and the wheel phase angle difference (PD) are received at the second time (T2) (Step 702 and Step 510, as shown in FIG. 7. It is assumed that the ECU 300 has received the first frame. The ECU 300 calculates the first time (T1) based on the fixed time delay known to the ECU 300 (Step 704). The calculated first time (T1) is a reference point at which the ABS data will be analyzed. The ECU 300 further calculates wheel phase angle (P1) by subtracting the wheel phase angle difference (PD) from the second phase angle (P2) (Step 706). The ECU 300 retrieves historic ABS data that is stored and determines ABS trace at the first and the second times (T1, T2) (Step 708). Subsequently, the ECU 300 compares wheel phase angles (P1, P2) which are transmitted from the wheel unit against ABS data at the first and the second time (T1, T2) (Step 710). As a result, the ECU 300 assigns the identifier to a location whose phase angle difference of ABS data mostly closely matches to the wheel phase angle difference transmitted from the wheel unit (Step 712).

Figure 8:
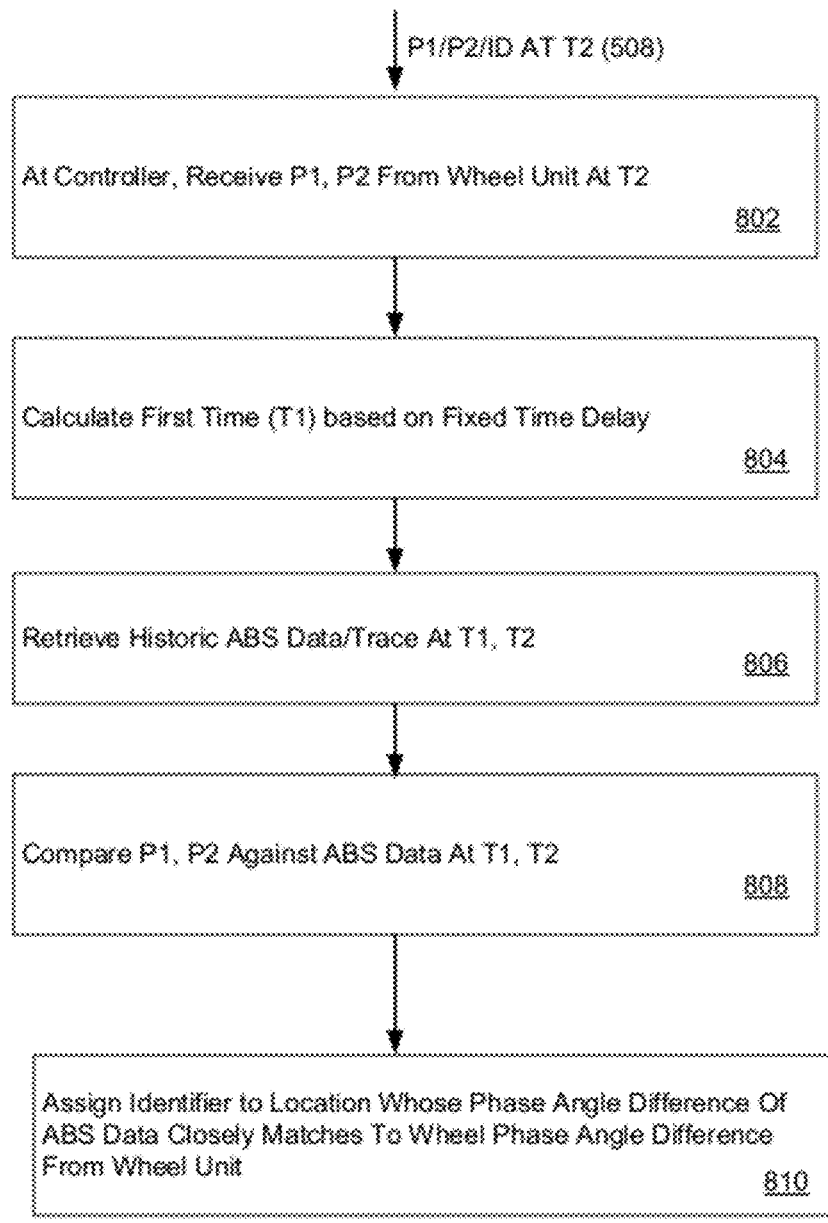
FIG. 8 is a flow chart illustrating another embodiment of the method for performing auto-location of the wheel using wheel phase angle information.

FIG. 8 is a flow chart further illustrating another embodiment of the auto-location method. In the illustrated embodiment, the wheel phase angles (P1, P2) are received at the second time (T2) (Step 802), as shown in FIG. 8, unlike the embodiments illustrated in FIGS. 6 and 7. The ECU 300 calculates the first time (T1) based on the fixed time delay as the reference point (Step 804). Subsequently, the ECU 300 retrieves stored ABS data and determines ABS trace at the first and the second times (T1, T2) (Step 806). The ECU 300 then compares wheel phase angles (P1, P2) which are transmitted from the wheel unit 101 against ABS data at the first and the second time (T1, T2) (Step 808). As a result, the ECU 300 assigns the identifier to location whose phase angle difference of ABS data most closely matches to the wheel phase angle difference transmitted from the wheel unit (Step 810).

As discussed in connection with the above-described embodiments, the wheel units 101, 102, 103, 104 measure the wheel phase angle of the associated wheels LF, RF, LR and RR at two different times and determine the relative phase angle difference. The relative phase angle difference is transmitted to the ECU 300 at a later measurement time such that the relative phase angle difference is compared with similar information extracted from the ABS system. The ECU 300 will receive RF messages from the wheel units 101, 102, 103, 104 including the phase angle difference and compare the phase angle difference from the wheel units 101, 102, 103, 104 with the ABS data from the ABS sensors 201, 202, 203, 204. The ECU 300 periodically receives the ABS data and stores a variable rolling window of the ABS data which covers the first time (T1) and the second time (T2). Thus, the ECU 300 may estimate, by interpolation of the RF message phase measurement, what the ABS data from each ABS sensor would have been between the first time (T1) and the second time (T2) and searches for a match from the ABS data for a wheel unit that has a similar wheel angle. The purpose of the correlation is to determine which set of ABS data matches with the deduced phase angle of the wheel phase angle sensor 212.

In the above-described embodiments, the ECU 300 determines and uses as a reference point the first and the second times T1, T2 in order to perform the auto-location. The ECU 300 calculates the first time based on the second time T2 and the fixed time delay known to the ECU 300. The ECU 300 then determines ABS data that corresponds to the first and the second time T1 and T2. In other words, the above-described embodiments rely upon the first time (T1) and the second time (T2) to define a relevant wheel phase angle and relevant ABS data for correlation. By comparing two different sets of data within the identical reference points, T1 and T2, accurate correlation may be obtained. Simple and accurate implementation of correlation between the wheel phase angle information from the wheel units 101, 102, 103, 104 and the ABS data may be obtained. Furthermore, the period between the first time (T1) and the second time (T2) may be easily variable to accommodate changing situations and ensure the system accuracy requirements.

Moreover, as the wheel units 101, 102, 103, 104 may calculate and determine the phase angle difference, calculation burdens on the ECU 300 may be reduced. Because a tire pressure monitoring system is a time-sensitive application, reduced calculation time by the ECU 300 may increase accuracy and efficiency of such systems.

Figure 9:
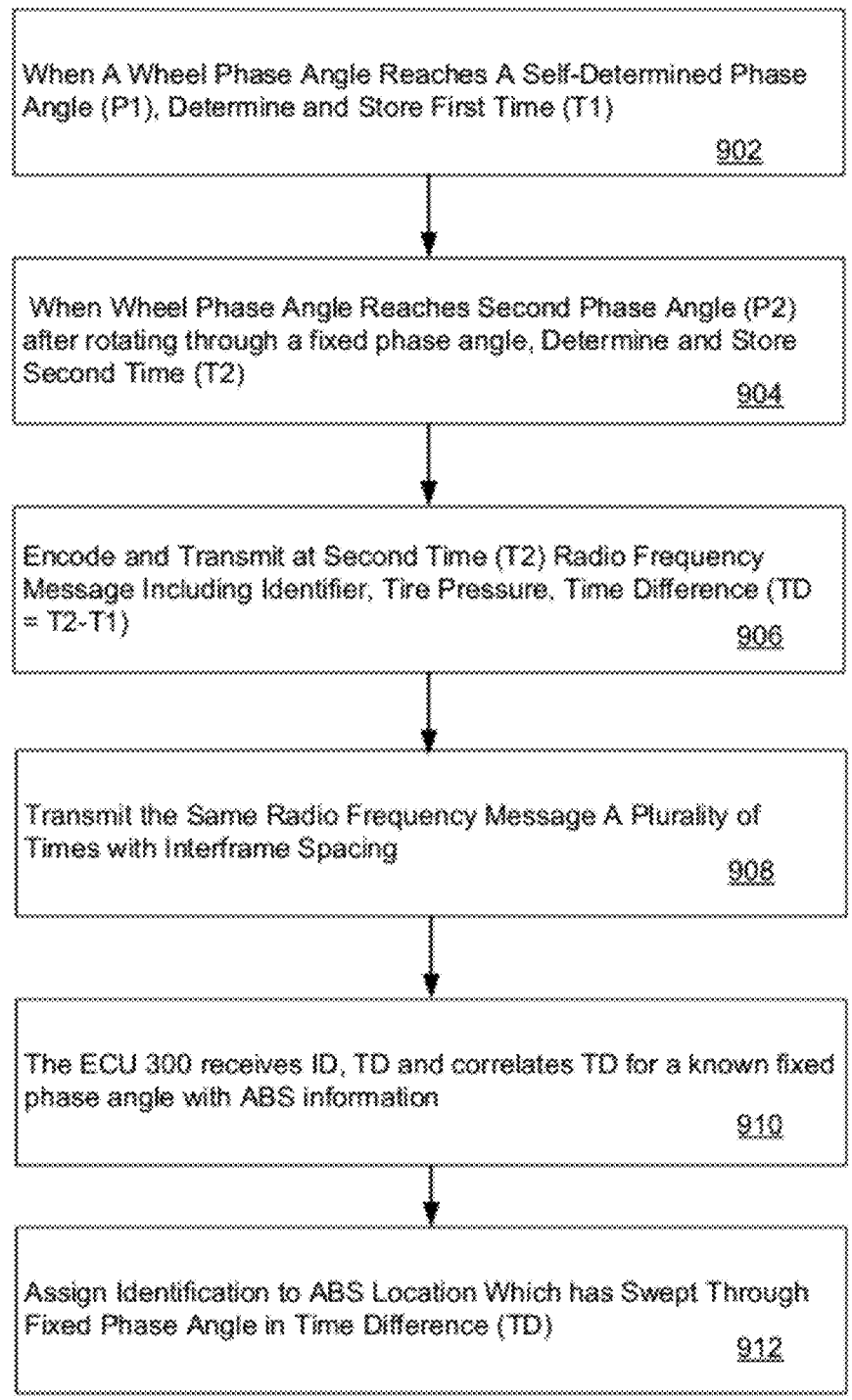
FIG. 9 is a flow chart illustrating another embodiment of the method for performing auto-location of the wheel using wheel phase angle information.

In the above-described embodiments, auto-location for determining the location of TPM sensors is performed based on the fixed time delay between the phase angle measurements and the variable phase angle difference. In another embodiment, the auto-location may also be realized by the wheel units 101, 102, 103, 104 and the ECU 300 knowing a fixed phase angle difference or a fixed phase delta which will occur between variable measurements times (TD=T2−T1). In other words, the phase delta is fixed, and the period between the first time (T1) and the second time (T2), i.e., T2−T1 is variable. Referring to FIG. 9, the embodiment where the phase delta is fixed and the time period (T2−T1) is variable is explained in detail. When a wheel unit 102 decides to perform an auto-location event, the wheel unit 102 waits until it reaches a self-determined phase angle (P1). The wheel unit 102 then determines the time that the self-determined phase angle (P1) is reached and stores such time (T1) (Step 902). In this embodiment, the wheel unit 102 is discussed only for convenience and other wheel units 101, 103 and 104 may be equally available. After rotating through the fixed phase delta known to the wheel unit 102 and the ECU 300, the wheel unit 102 reaches the second phase angle P2 (P2=P1+fixed phase delta) (Step 904). The wheel unit 102 determines the time that the second phase angle P2 is reached and stores the time (T2) (Step 904).

The wheel unit 102 transmits the identification, and Time Difference (TD=T2−T1) (Step 906). As discussed above in conjunction with FIG. 5, the wheel unit 102 transmits the same radio frequency message a plurality of times to ensure that the ECU 300 receives the radio frequency message (Step 908). The ECU 300 receives the identification and the Time Difference (TD). The ECU 300 correlates the Time Difference (TD) for a known phase angle with ABS information (Step 910). The identification is assigned to the ABS location which has swept through the fixed phase angle in the Time Difference (TD) (Step 912). In this implementation, the fixed phase angle does not have to be an integer number of revolutions. In other words, the second phase angle (P2) does not have to equal (P1+(N*360°)), where N is an integer. The phase difference (PD) could be encoded in the transmission at T2, or it could be a pre-determined value which is known to both the wheel unit and the ECU.

The foregoing embodiments describe that the wheel unit transmits wheel phase angle information which includes actual measurements, a value derived from the actual measurement, etc. such as first phase angle P1, the second phase angle P2, and/or the phase angle difference (PD). The wheel phase angle information, however, is not limited to the actual measurement of the wheel phase angle and/or the phase angle difference. The wheel phase angle information may include any information indicative of, and/or translatable to a wheel phase angle. Moreover, the wheel phase angle information may include information that prompts or triggers auto-location. For example, the wheel phase angle information may include wheel phase angle indication. Receipt or detection of the wheel phase angle indication may trigger the ECU to perform a phase correlation data storage event. The ECU continuously maintains a rolling window of the ABS data. In response to the phase correlation data storage event, the ECU stores or captures relevant ABS data. In one embodiment, the wheel phase angle indication may include a predefined function code. In another embodiment, the wheel phase angle indication may include setting a bit which is normally unused in a RF message structure, or a most significant bit of a certain data byte. Alternatively, or additionally, the wheel phase angle indication may include temperature data or interframe spacings of RF transmissions.

Moreover, the foregoing embodiments compare a wheel phase angle difference with ABS data at two different times (T1, T2) to perform auto-location of a wheel. Alternatively, or additionally, the auto-location of the wheel where the TPM sensor is arranged may require a snapshot of information at one measurement point of a wheel phase angle during a rotation of the wheel, where a snapshot is a capture of information from a short duration of a continuous stream of information. The wheel unit transmits an RF message that includes or is associated with the wheel phase angle indication. The ECU holds a rolling window of wheel phase and/or speed data such as ABS data for all wheels. Upon receipt of the RF message, the ECU captures and stores a current content of the rolling window of the ABS data. Then, the ECU determines relevant ABS data from the rolling window at a predetermined time, i.e., T1. An auto-location algorithm is applied to the stored ABS data in order to identify the specific location of the wheel where the TPM sensor is arranged. Referring to FIGS. 10-17, these different embodiments of the wheel auto-location system and method are described below.

Figure 10A:
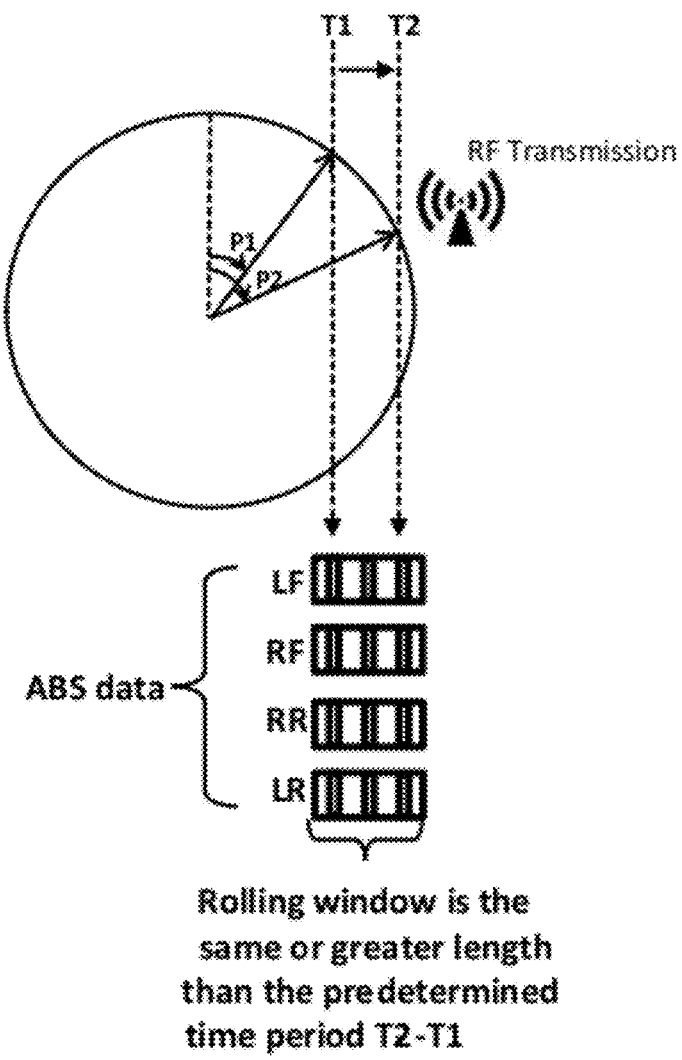
FIG. 10A illustrates correlation between ABS data and a one-measurement point during a rotation of a wheel and FIG. 10B illustrates storage of the ABS data at the one-measurement point.

FIG. 10A illustrates the one-measurement point during the rotation of the wheel. The wheel unit 101 detects the first time (T1) when the wheel phase angle reaches the first phase angle (P1). The first phase angle (P1) is an angle of interest which may be set depending on the hardware configurations of tire pressure monitoring systems. As one example, the first phase angle (P1) may be a zero-crossing point, i.e. zero, or a peak in order to facilitate efficient implementation of system hardware configurations. The first phase angle (P1) is not limited to the zero-crossing point or the peak and any angle can be set as the first phase angle (P1). The wheel unit 101 is described in this embodiment by way of example, and other wheel units 102, 103, 104 can be used. The wheel unit 101 waits a predetermined time delay (TD=T2−T1) and transmits a RF message. In this embodiment, the controller 202 of the wheel unit 101 is programmed to know the predetermined time delay (TD). The wheel unit 101 may not measure a wheel phase angle at the second time (T2). Accordingly, the wheel phase angle at the second time (T2) is undetermined in this embodiment. In other embodiments, the wheel phase angle at the second time (T2) may be measured. The ABS sensors 201, 202, 203, 204 transmit ABS data to the ECU 300 via the receiver 400, as described in connection with FIG. 1 above. In another embodiment, fewer than four ABS sensors may transmit ABS data to the ECU 300, which will be further described below.

Figure 10B:
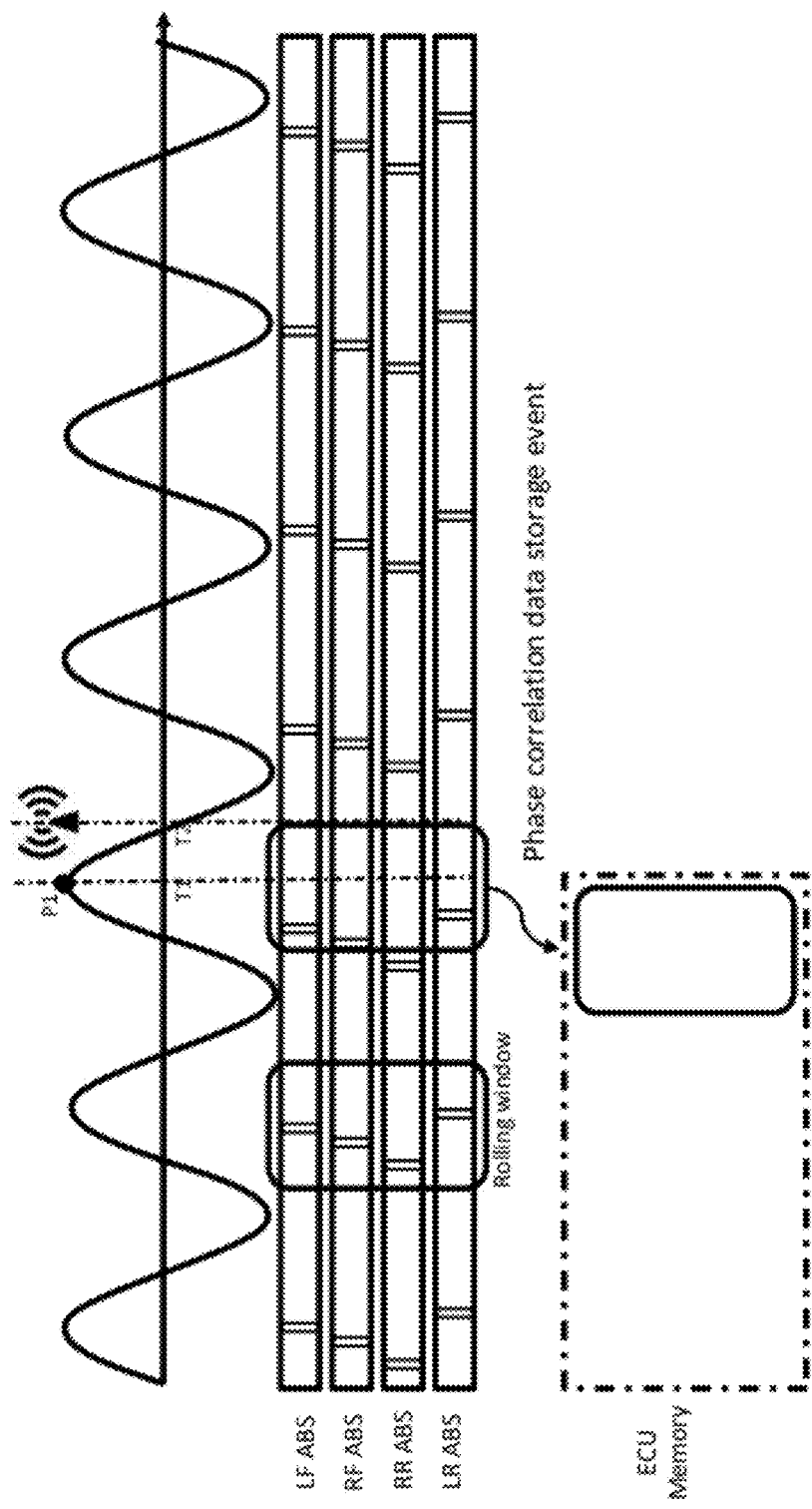

FIG. 10B illustrates the rolling window of the ABS data from four wheels. The ECU 300 continuously maintains the rolling window of the ABS data as shown in FIG. 10B. The sinusoidal wave of the wheel phase angle at the first time (T1) and the second time (T2) is also shown in FIG. 10B. The ECU 300 does not store or capture each rolling window of the ABS data. Instead, the ECU 300 responds to a phase correlation data storage event trigger and captures the current content of the rolling window of the ABS data that spans the first time (T1) and the second time (T2) as illustrated in FIG. 10B. The phase correlation data storage event trigger will be described in detail below, referring to FIGS. 11A-11D. The ECU 300 repeats this capturing or storing process multiple times until a significant number of the current contents of the ABS data is captured and stored in order to ensure reliability.

Figure 11A:
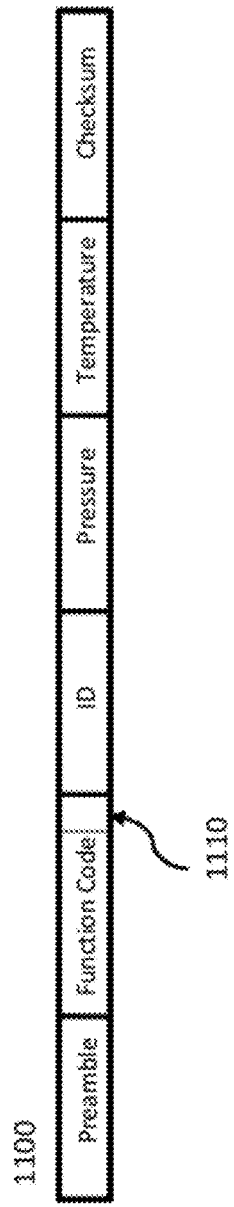
FIGS. 11A-11D illustrate various embodiments of a phase correlation data storage event trigger based on various wheel phase angle indications.
Figure 11B:
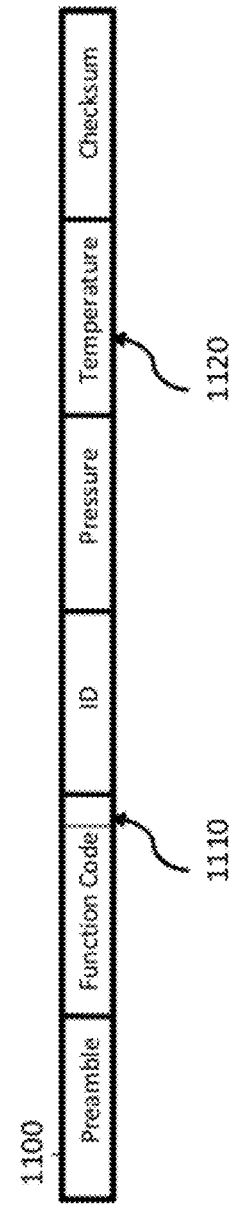
Figure 11C:
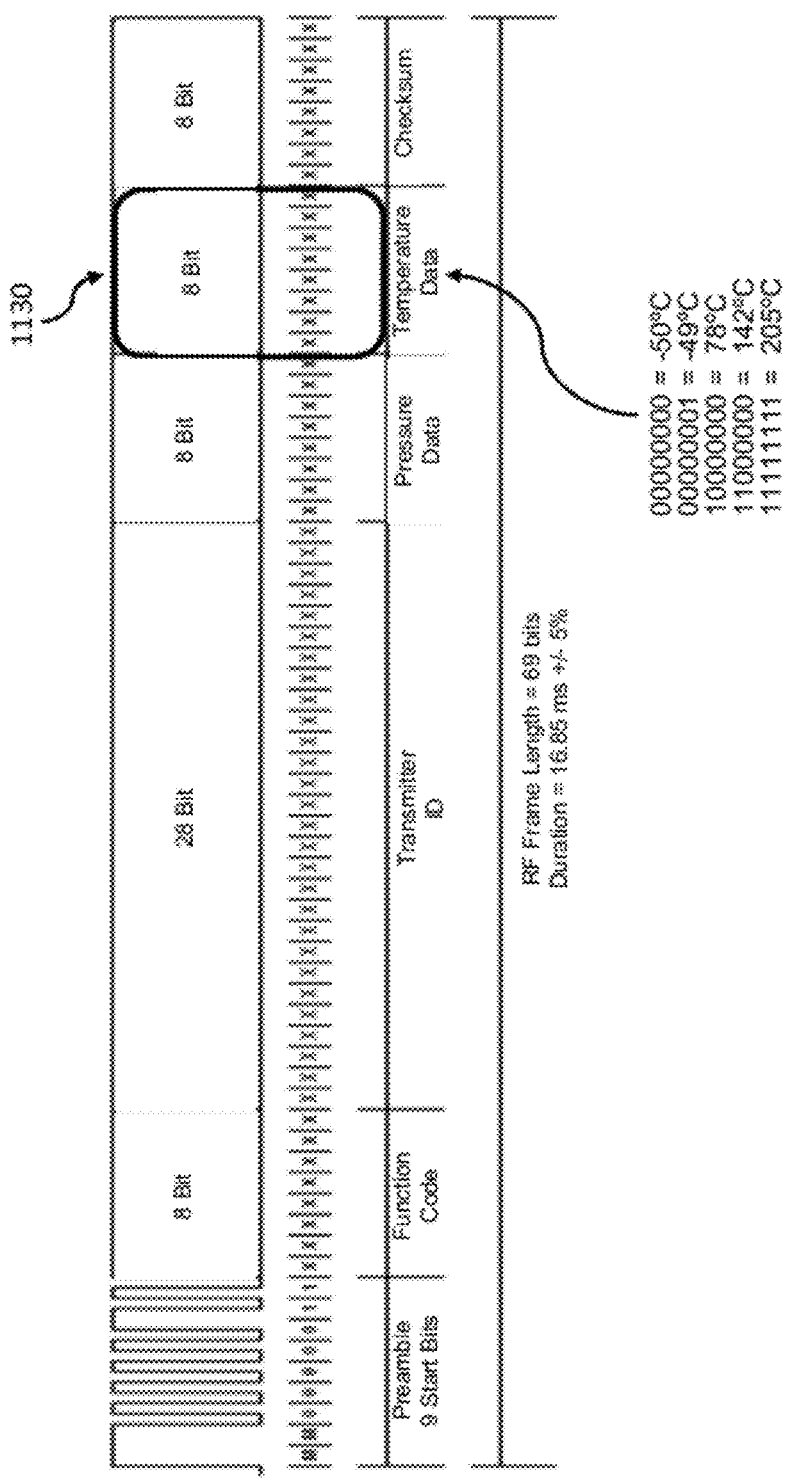

FIGS. 11A-11D illustrate various embodiments of implementing the phase correlation data storage event trigger. FIGS. 11A-11D also illustrate various embodiments of implementing wheel phase angle indication such that the phase correlation data storage event is triggered. FIGS. 11A-11C illustrate contents of RF messages transmitted by a wheel unit and received by the ECU. Referring to FIGS. 11A and 11B, a first embodiment of the wheel phase angle indication is explained. In the first embodiment, an RF message 1100 contains information corresponding to wheel phase angle indication. In FIGS. 11A and 11B, an exemplary RF message 1100 sent from the wheel unit 101 is illustrated. The RF message includes digital data arranged in a number of data fields including, for example, a synchronization field such as a data preamble, a function code field, an identifier field, a pressure data field, a temperature data field and an error detection and correction field such as a checksum. Additional or fewer data fields may be used and the field locations in the RF message may be standardized to ensure reliable reception of the RF message. The structure of the RF message 1100 may vary depending upon vehicle hardware and/or software where this embodiment of the wheel auto-location system and method is used. In this embodiment, the function code field corresponds to the wheel phase angle indication. The function code field may be referred to as a status code field or a status byte field.

As described above, the wheel unit 101 transmits the RF message 1100 at the second time (T2) after the wheel phase angle reaches the first phase angle (P1) and waits the predetermined time delay (TD). The RF message 1100 may not include an actual wheel phase angle, as shown in FIGS. 11A and 11B. The RF message of FIG. 11A includes a preamble, a function code 1110, an identification of a wheel, tire pressure, temperature, and a checksum. The RF message structure including the preamble, the tire pressure, the checksum, etc. as shown in FIG. 11A uses a conventional RF message structure. The function code 1110 may include a predefined function code which prompts or instructs the ECU 300 to trigger a phase correlation data storage event. The phase correlation data storage event indicates to the ECU 300 that a current content of a rolling window of the ABS data should be captured by the ECU 300. As described in connection with FIG. 1 above, the ECU 300 receives ABS data from the ABS sensors 201, 202, 203, 204. The ECU 300 is continuously holding a rolling window of the ABS data which has dimensions the same or greater than the predetermined time period (TD). As shown in FIG. 10B, the ECU 300 captures the current content of the rolling window of the ABS data in response to the phase correlation data storage event and stores it in its storage.

Referring back to FIGS. 11A and 11B, the function code 1110 may include a bit that has been set or changed to set to trigger the phase correlation data storage event. As one example, the bit is normally unused in a RF message structure. As another example, the bit includes two most significant bits of a certain data byte, which is normally set to zero. As shown in FIG. 11A, the RF message 1100 sent from the wheel unit 101 includes wheel phase angle indication by adding the function code 1110. For example, the RF message 1100 is encoded to set a bit of the function code 1110 that triggers the phase correlation data storage event. The RF message 1100 shown in FIG. 11A includes no actual phase angle. The RF message 1100 may include the wheel phase angle indication implemented by the function code bits 1110. The structure of the RF message 1100 has benefits of including no wheel phase angle information. This message structure having no wheel phase angle information may provide flexibility as a standard frame protocol may not need to change in order to include phase angle information.

In FIG. 11B, the RF message 1100 may include data defining the predetermined time delay (TD=T2−T1) 1120 using a dataframe assigned to temperature data in addition to the function code bits 1110. The predetermined time delay may represent the wheel phase angle. In another embodiment, the RF message 1100 may include a pseudo-random number that indicates or is translatable to the wheel phase angle. Various types of information which represents the wheel phase angle may be included in the RF message 1100. For example, the wheel phase information could be encoded into 8 bits of data. This would allow a phase resolution of 360/255=1.41° to be realized.

Another method to provide wheel phase information is to assign a code to specific wheel phase angles. The transmitter 214 (FIG. 2) would then transmit the code which corresponds to the particular phase angle of interest. In this embodiment, the ECU 300 stores a lookup table in the storage 304. The lookup table maps the codes to actual phase angles, and the ECU 300 then deduces the phase from the transmitted code. In a further embodiment, the time delay (TD) may be one of several options known to both the wheel units 101, 102, 103, 104 (FIGS. 1 and 2) and the ECU 300. More specifically, the wheel units 101, 102, 103, 104 will transmit a short code which corresponds to one of the several options. The ECU decodes the short code, and determines which of the several options for the time delay (TD) have been used by the wheel units 101, 102, 103, 104. In a further embodiment, the wheel units 101, 102, 103, 104 may encode the actual time delay (TD) value in the radio frequency transmission. For example, with a resolution of 1 millisecond and eight bits of information, a time delay of 255 milliseconds could be communicated.

Referring to FIG. 11C, a second embodiment of the phase correlation data storage event trigger is described. FIG. 11C illustrates an RF message that includes temperature data 1130. In this embodiment, the temperate data 1130 includes 8 bits. As shown in FIG. 11C, 8 bits of temperature data indicate the normal operating temperature range of the tire pressure sensor 208 (FIG. 2). The normal operating temperature generally ranges from −40° C. to +125° C., and the temperature byte 1130 has the capability to indicate temperatures from −50° C. to +205° C. The temperatures above +125° C. may not have any practical application. Accordingly, some of the temperature bits are used to encode the wheel phase angle indication. By using the example illustrated in FIG. 11C, the temperature of +142° C. corresponds to 11000000 and the two most significant bits of the temperature byte are '11.' The temperature of +142° C. is well above the maximum operating temperature. The code, 11000000 may be used to trigger a phase correlation data storage event in this embodiment.

Figure 11D:
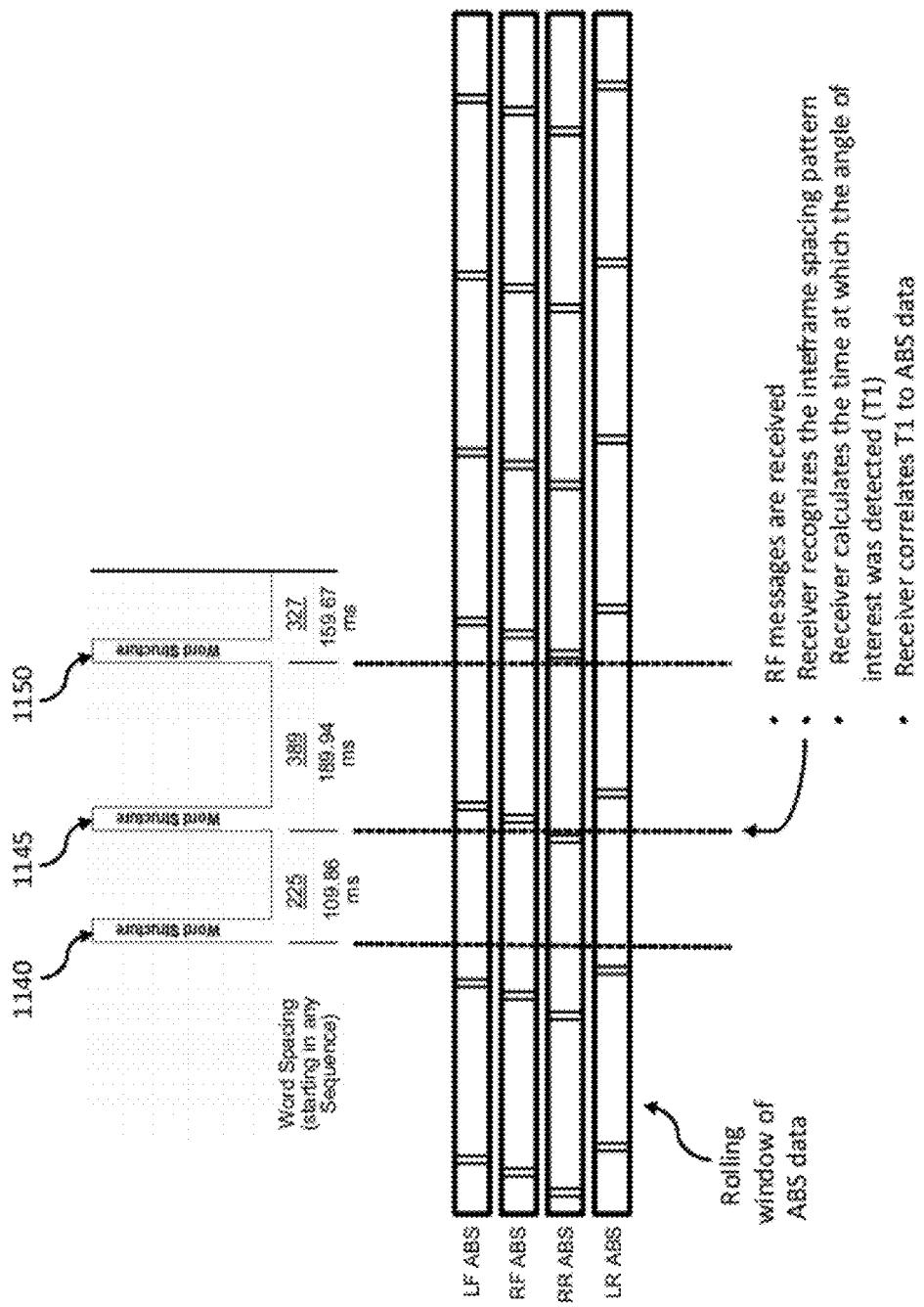

In FIG. 11D, a third embodiment of a phase correlation data storage event trigger is illustrated. In the third embodiment, an interframe spacing among a series of RF message transmissions corresponds to the wheel phase angle indication and is used to trigger the phase correlation data storage event. In this embodiment, multiple RF message transmissions occur during the one second transmission. For instance, the identical information is transmitted eight times over a one second time period. The structure of the RF message frame, the number of RF message frames and the interframe spacings discussed in this embodiment are only by way of example and not limited thereto. The structure of the RF message frame, the number of RF message frames and/or the interframe spacings may vary.

As shown in FIG. 11D, each interframe spacing between two consecutive RF transmissions varies. In this embodiment, 109.86 ms, 189.94 ms and 159.67 ms are respectively set as interframe spacings. The interframe spacings are encoded and known to the ECU 300. When the ECU 300 receives the first three RF transmissions 1140, 1145 and 1150, the ECU 300 recognizes the interframe spacings of 109.86 ms and 189.94 ms. Then, the ECU 300 calculates when the first RF transmission 1140 is received. The time that the first RF transmission 1140 is received corresponds to the second time (T2). The ECU 300 subsequently calculates the first time (T1) and determines the ABS data at the first time (T1).

In FIGS. 11A-11D, various embodiments of the phase correlation data storage event trigger are explained. However, the wheel auto-location method is not limited to those embodiments and other ways of implementing the phase correlation data storage event are available. As described in connection with the embodiments of FIGS. 11A-11D, the ECU 300 receives or recognizes the phase correlation data storage event trigger based on the wheel phase angle indication. The ECU 300 responds to the wheel phase angle indication and performs the phase correlation data storage event. As illustrated in FIG. 10B, the ECU 300 stores or captures the current content of the rolling window of the ABS data in response to the wheel phase angle indication. Then, the ECU 300 calculates the first time (T1) based on the predetermined time delay (TD) which has been known to the ECU 300. The ECU 300 determines relevant ABS data from the ABS data stream, i.e., the stored current content of the rolling window of the ABS data relevant to the first time (T1). In this embodiment, the relevant ABS data corresponds to an ABS tooth count number at the first time (T1). The relevant ABS data is stored over time as the ECU 300 receives the RF message 1100 multiple times and repeatedly determines and stores the relevant ABS data. The ECU 300 stores the ABS data in the storage 304 and executes an auto-location algorithm that correlates the stored relevant ABS data with a specific wheel location. The auto-location algorithm is executed to identify the specific wheel location based on the trace of the relevant ABS data using a statistical correlation method.

Figure 12:
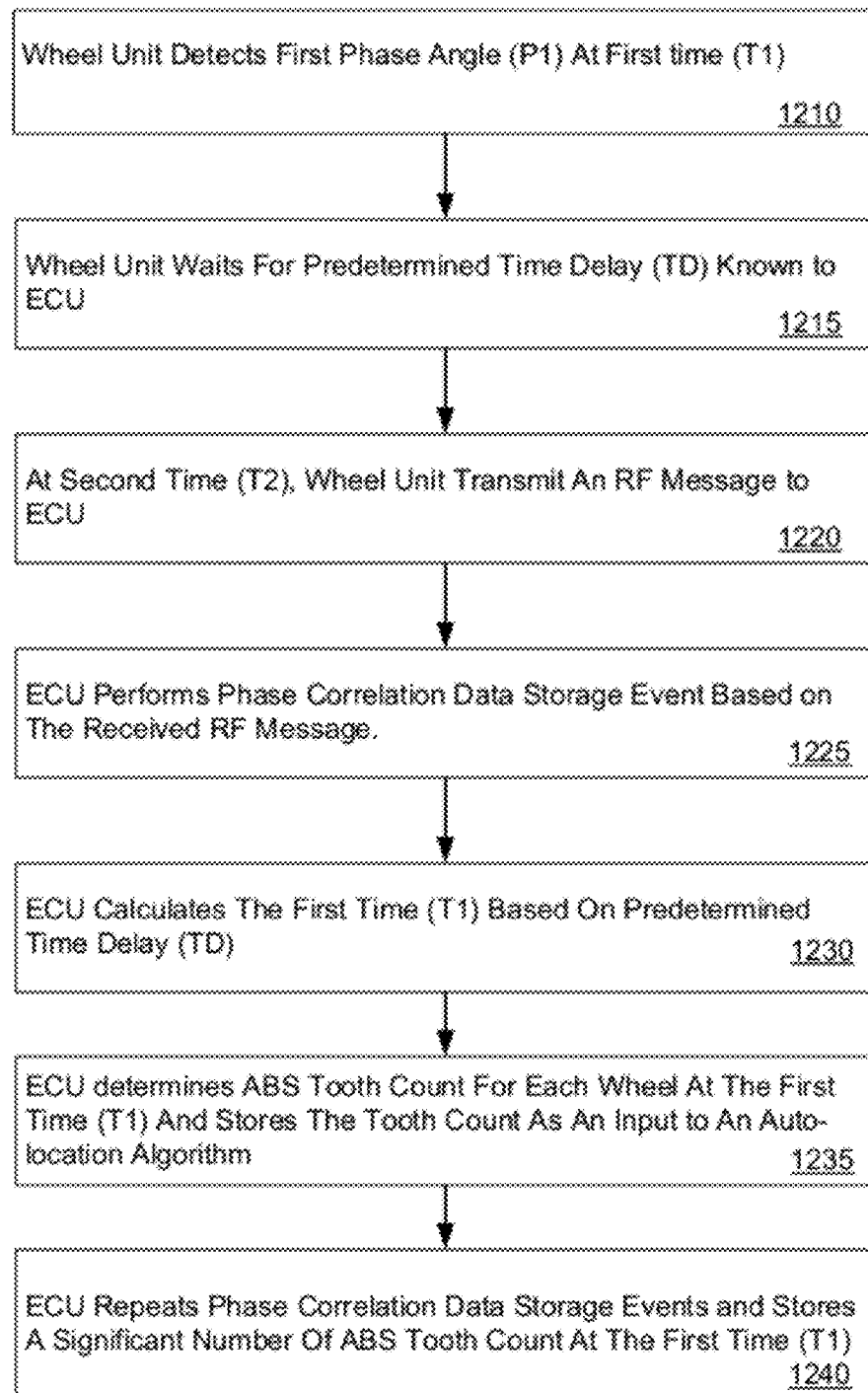
FIG. 12 is a flow chart illustrating one embodiment of an auto-location method based on the ABS data at the one-measurement point.

Referring to FIG. 12, one embodiment of an auto-location method is further explained in detail. The wheel unit 101 detects the first phase angle (P1) which is set as an angle of interest at the first time (T1) when the first phase angle (P1) is reached (Step 1210). The first phase angle (P1) is not limited to a particular angle and is set depending on system hardware configuration. Actual values of the first phase angle (P1) may depend on a frequency of wheel rotation.

The wheel unit 101 waits for the predetermined time delay (TD=T2−T1) where the time delay is known to the ECU 300 (Step 1215). The wheel unit 101 may not measure a phase angle other than the measurement at the first time (T1). In this embodiment, timing of one measurement, i.e., T1 and the predetermined time delay (TD) may be indicative of the wheel phase angle. Actual phase angles of the wheel may not be used.

After waiting the predetermined time delay (TD), the wheel unit 101 transmits the RF message 1100 to the ECU 300 at the second time (T2) (Step 1220). The RF message 1100 includes the wheel phase angle indication. As described above, the RF message 1100 includes predefined function code bits 1110 such that the phase correlation data storage event will be triggered by the ECU 300.

The ECU 300 continuously maintains a rolling window of the ABS data, the window having dimensions the same or greater than the predetermined time delay (TD). The ECU 300 receives the RF message 1100 and recognizes the function code bits 1110 (Step 1225). When the RF message 1100 includes the time delay (TD) data, the ECU 300 also recognizes such data. When the time delay (TD) data is recognized, the ECU 300 stores the current values in the rolling window of the ABS data. These current values of the rolling window will be used by the ECU 300 to perform the phase correlation data storage event upon receipt of the RF message 1100.

The ECU 300 calculates the first time (T1) based on the predetermined time delay (TD) upon receipt of the RF message 1100 (Step 1230). The ECU 300 then determines an ABS tooth count for each wheel at the first time (T1) (Step 1235). The ECU 300 stores the ABS tooth count and repeats this process until a significant number of the phase correlation data storage events have occurred (Step 1240). The stored ABS tooth count values are provided as an input to the auto-location algorithm. The output of the auto-location algorithm is the association of a wheel unit ID with a specific ABS sensor location on the vehicle.

Figure 13:
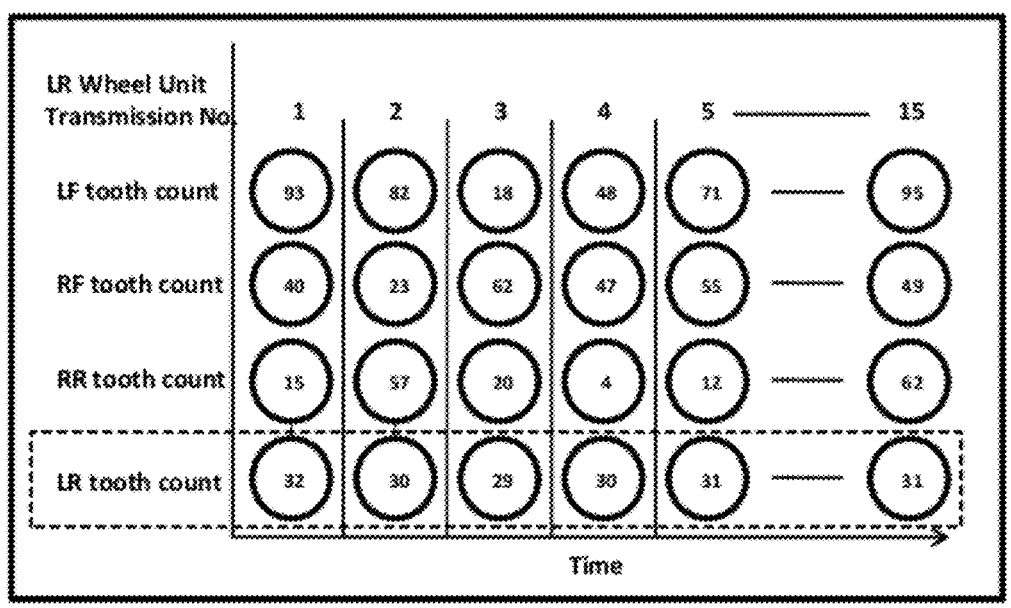
FIG. 13 illustrates one embodiment of ABS tooth count values for four wheels with respect to RF transmissions from a left rear wheel unit.
Figure 14:
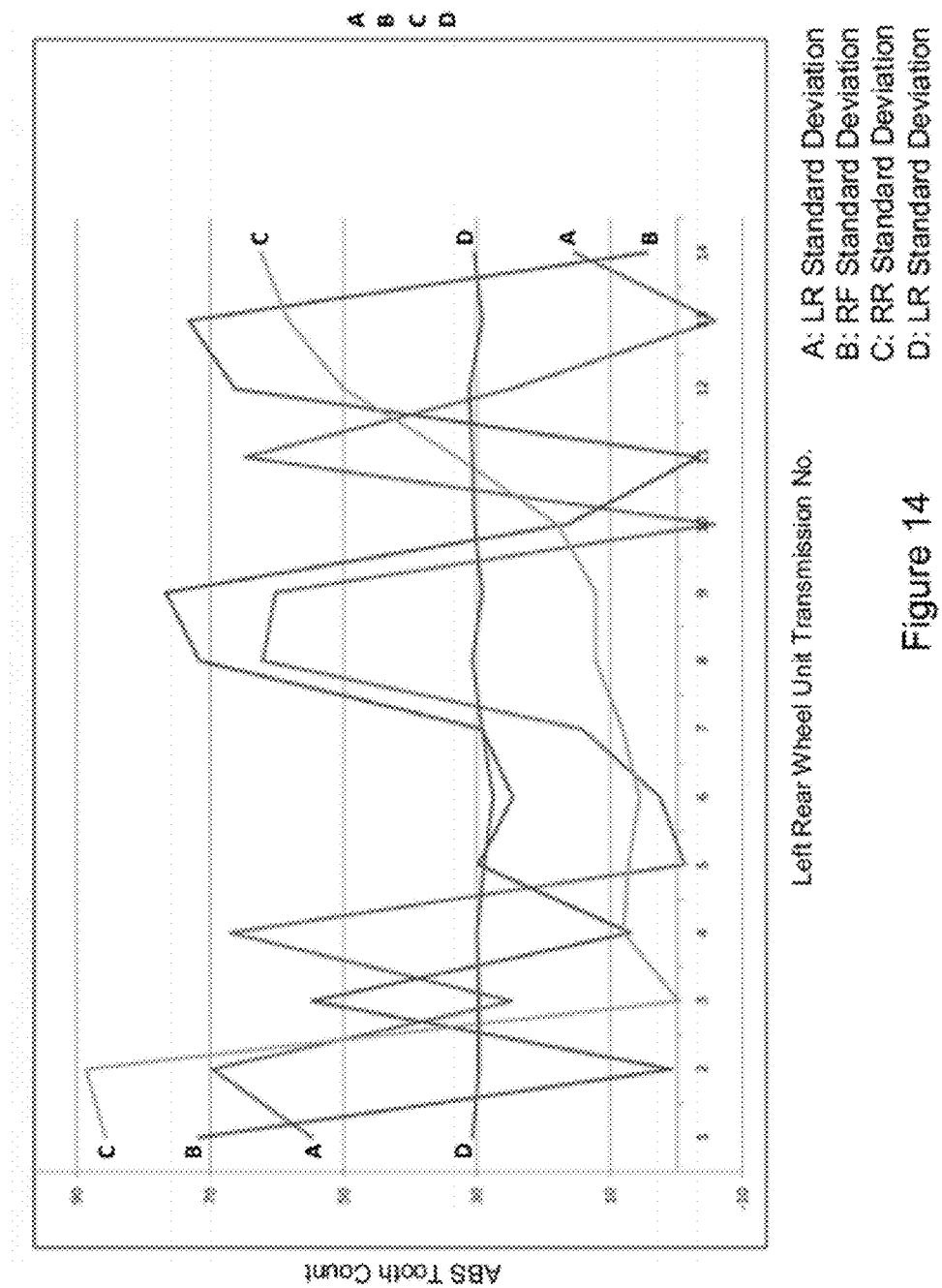
FIG. 14 is a graph illustrating ABS tooth count values of FIG. 13.

Referring to FIGS. 13-17, the auto-location algorithm is explained. FIGS. 13 and 14 illustrate one example of the ABS tooth count values at the first time (T1) for all wheels which have been stored by the ECU 300. With respect to a series of the RF transmissions from a left rear wheel unit, the ABS tooth count values at the first time (T1) from a left front ABS sensor are 93, 82, 18, 48, 71 for the first five transmissions. Likewise, the ABS tooth count values at the first time (T1) from a right front ABS sensor and a right rear ABS sensor are 40, 23, 62, 47, 55 and 15, 57, 20, 4, 12, respectively, for the first five transmission. On the other hand, a left rear ABS sensor shows a statistically significant and consistent tooth count values, i.e., 32, 30, 29, 30, 31 at the first time (T1) for the first five transmissions. Even after 15 transmissions, the consistent tooth count values remain unchanged. The auto-location algorithm uses the stored ABS tooth count values as an input.

The stored ABS tooth count values as shown in FIGS. 13 and 14 enable the ECU 300 to perform statistical processing. The stored ABS tooth count values show a historic trace of the ABS tooth count values for each wheel. By statistically processing the trace of the ABS tooth count values at a one-measurement point, identifying a specific location of a wheel is achieved. One example of the statistical processing uses a standard deviation of the ABS tooth count values over time, as will be described in detail below. Another example of the statistical processing may include variance. The statistical calculation will also be designed with consideration of ease of calculation and minimization of memory resources.

Figure 15A:
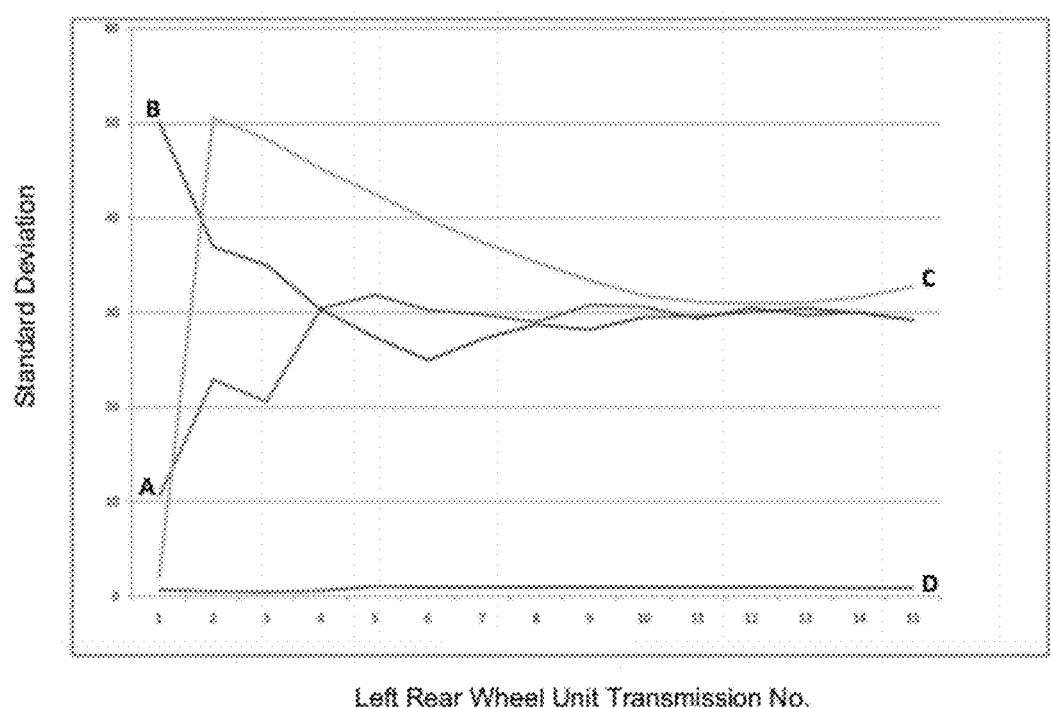
FIG. 15A illustrates one embodiment of a standard deviation of ABS sensor tooth count values with respect to RF transmissions from a left rear wheel unit.
Figure 15B:
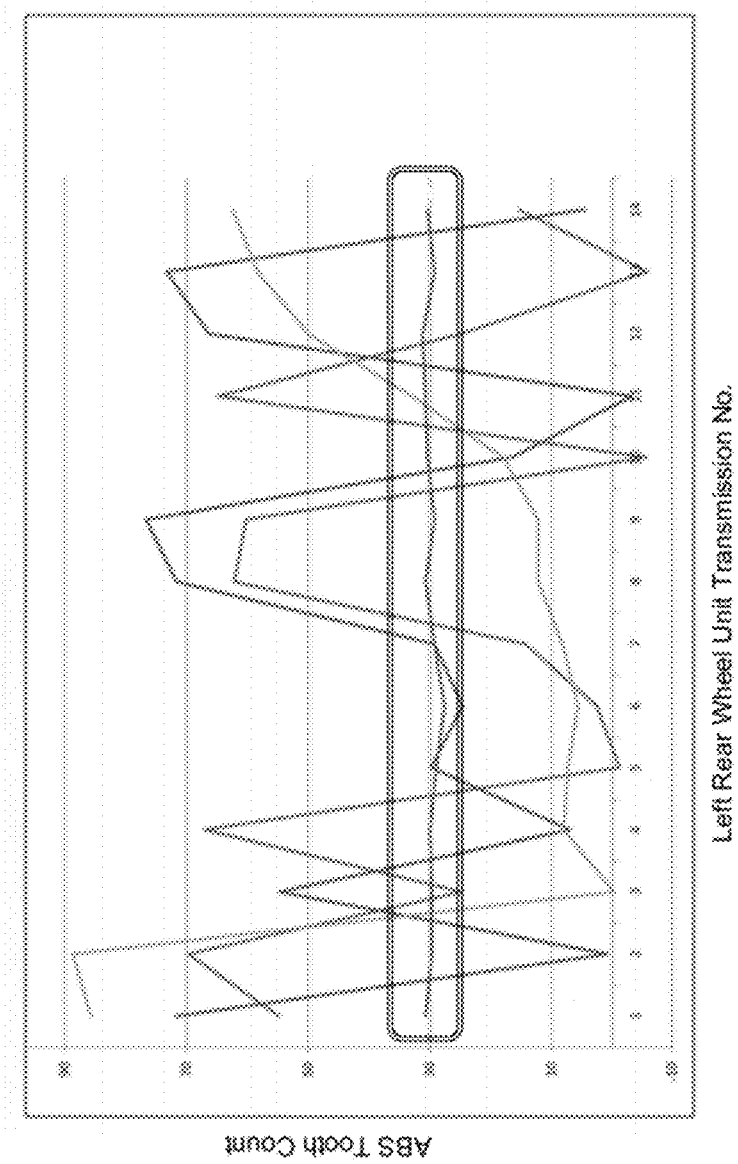
FIG. 15B illustrates one embodiment of a trend of ABS sensor tooth count values with respect to RF transmissions from a left rear wheel unit.
Figure 16:
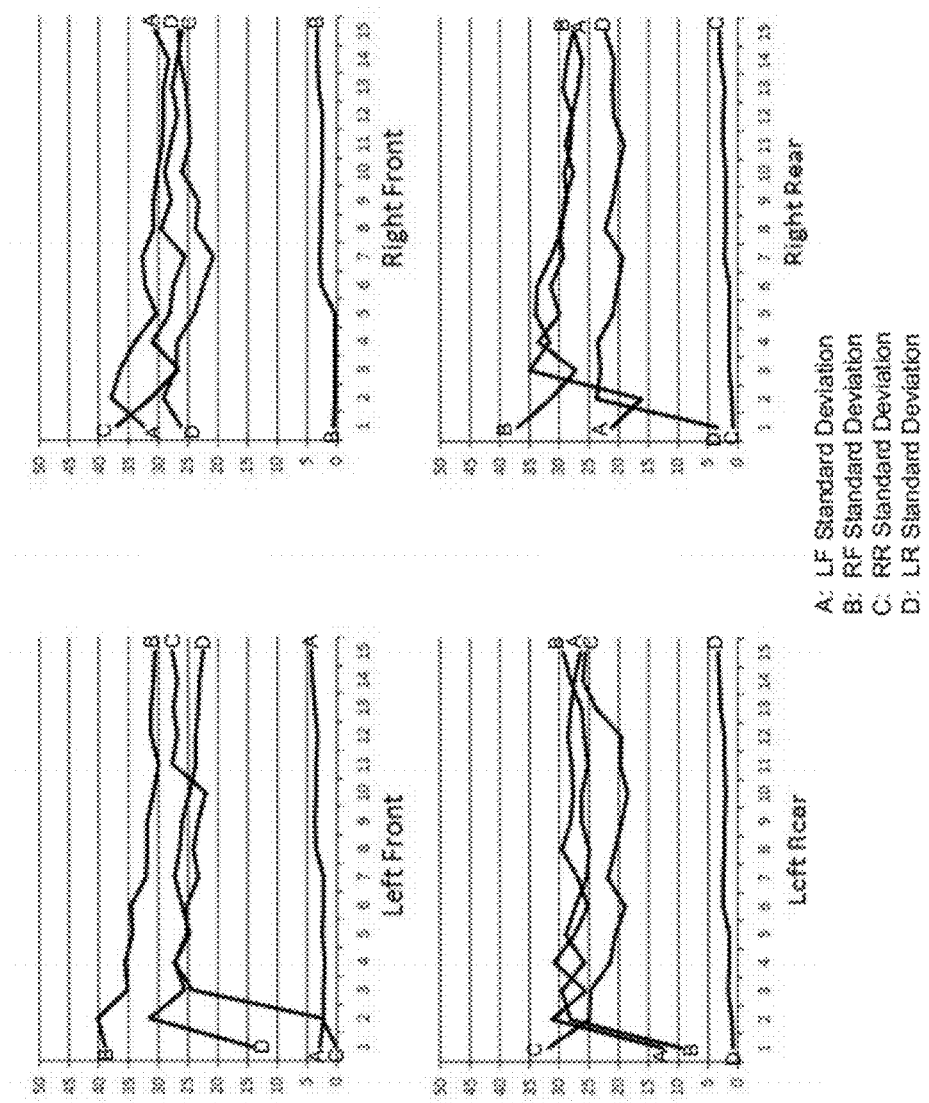
FIG. 16 illustrates one example of a standard deviation of ABS tooth count values for four wheels with respect to RF transmissions from left front, right front, left rear and right rear wheels.

Referring to FIGS. 15A and 15B, FIG. 15A illustrates one example of the standard deviation for all four wheels, and FIG. 15B illustrates one example of the tooth count values for all four wheels with respect to the RF transmissions from the left rear wheel. When the auto-location algorithm calculates the standard deviation, the wheel location is associated with the location of the ABS sensor whose ABS data shows the lowest standard deviation (Step 1706). Referring to FIG. 16, the corresponding ABS sensor indicates the lowest standard deviation of ABS tooth count values.

In this embodiment, the auto-location algorithm determines a standard deviation of a series of ABS sensor tooth count values. As shown in FIG. 16, the ABS sensor assigned to a corresponding wheel shows a lowest standard deviation. For instance, for the left front (LF) wheel, the left front ABS sensor shows the lowest standard deviation. In other words, the left front ABS sensor shows the most consistent tooth count value at the first time (T1). Also, the left front ABS sensor shows a statistically significant trend. Likewise, for the right front (RF) wheel, the right front ABS sensor shows the lowest standard deviation with regard to a series of ABS tooth count values at the first time (T1). Thus, the ECU 300 executes the auto-location algorithm and correlates the ABS tooth count values with a specific wheel location. As a result, the ECU 300 assigns a wheel unit ID to the specific wheel location which is associated with the specific ABS sensor location.

Figure 17:
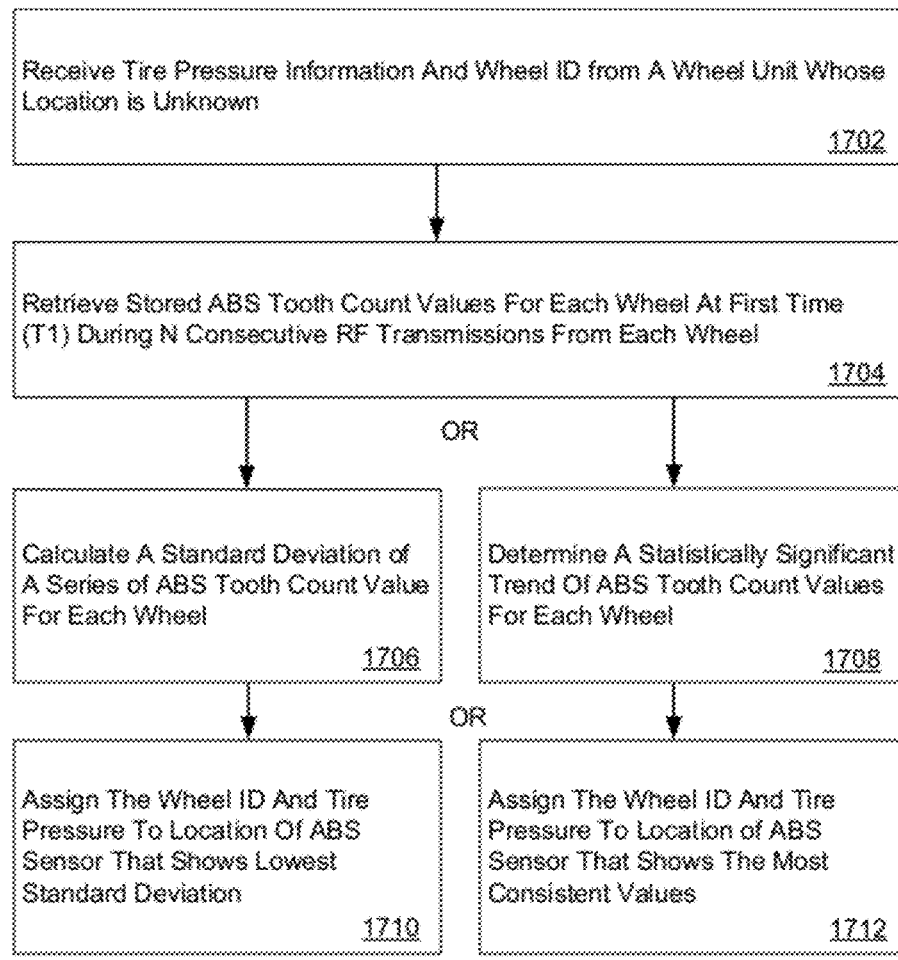
FIG. 17 is a flowchart illustrating one embodiment of an auto-location algorithm.

FIG. 17 is a flowchart illustrating one embodiment of the auto-location algorithm. As a drive of a vehicle begins, the ECU 300 receives a RF transmission including tire pressure and needs to identify the location of a wheel associated with the RF transmission (Step 1702). The ECU 300 checks whether a significant number of phase correlation data storage events have occurred and a reliable database is formed. When the reliable database is formed, the ECU 300 activates the auto-location algorithm (Step 1702). By way of example only, full auto-location times may be less than 5 minutes, with an average of less than 2 minutes. The auto-location algorithm remains active through the remainder of that drive. In this embodiment, the auto-location algorithm includes instructions of retrieving stored ABS tooth count values at the first time (T1) for each wheel during N consecutive RF transmission from each wheel (Step 1704). Referring to FIG. 13, ABS tooth count values, 93, 82, 18, 48, 71 . . . are retrieved with respect to the left front wheel. Likewise, different ABS tooth count values at the first time (T1) are retrieved with respect to the right front, the right rear and the left rear wheels.

In this embodiment, the auto-location algorithm further includes calculating a standard deviation of a series of ABS tooth count values for each wheel (step 1706). Alternatively, or additionally, the auto-location algorithm further includes instructions of determining a statistically significant trend of ABS tooth count values for each wheel (step 1708). In another further embodiment, the auto-location algorithm includes instruction of determining dynamic thresholds of a wheel unit associated with the tooth count values of minimum deviation. Dynamic thresholds allow the wheel auto-location system to dynamically change the decision parameters for the wheel assignment logic, i.e., the value set for the standard deviation can be changed. In one embodiment, dynamic thresholds indicate a multiple of the minimum deviation. The association decision will be based on the dynamic thresholds and thus will react to adverse operating conditions. Adverse operating conditions may be present in situations where a vehicle experiences driving on rough roads, extreme braking, etc. It is also advantageous to permit the system to have flexible, self-determined threshold criteria when operating on a surface which is conducive for optimal accuracy of wheel phase angle determination, but which results in the vehicle wheel speeds having minimal difference.

When the auto-location algorithm determines a statistically significant trend of ABS tooth count values, the wheel location is associated with the location of the ABS sensor whose ABS data shows the most consistent tooth count values or a statistically significant trend. Referring to FIG. 15B, the left rear ABS sensor shows the most consistent tooth count value and the lowest standard deviation at the first time (T1) throughout the series of RF transmission from the left rear wheel.

Figure 18:
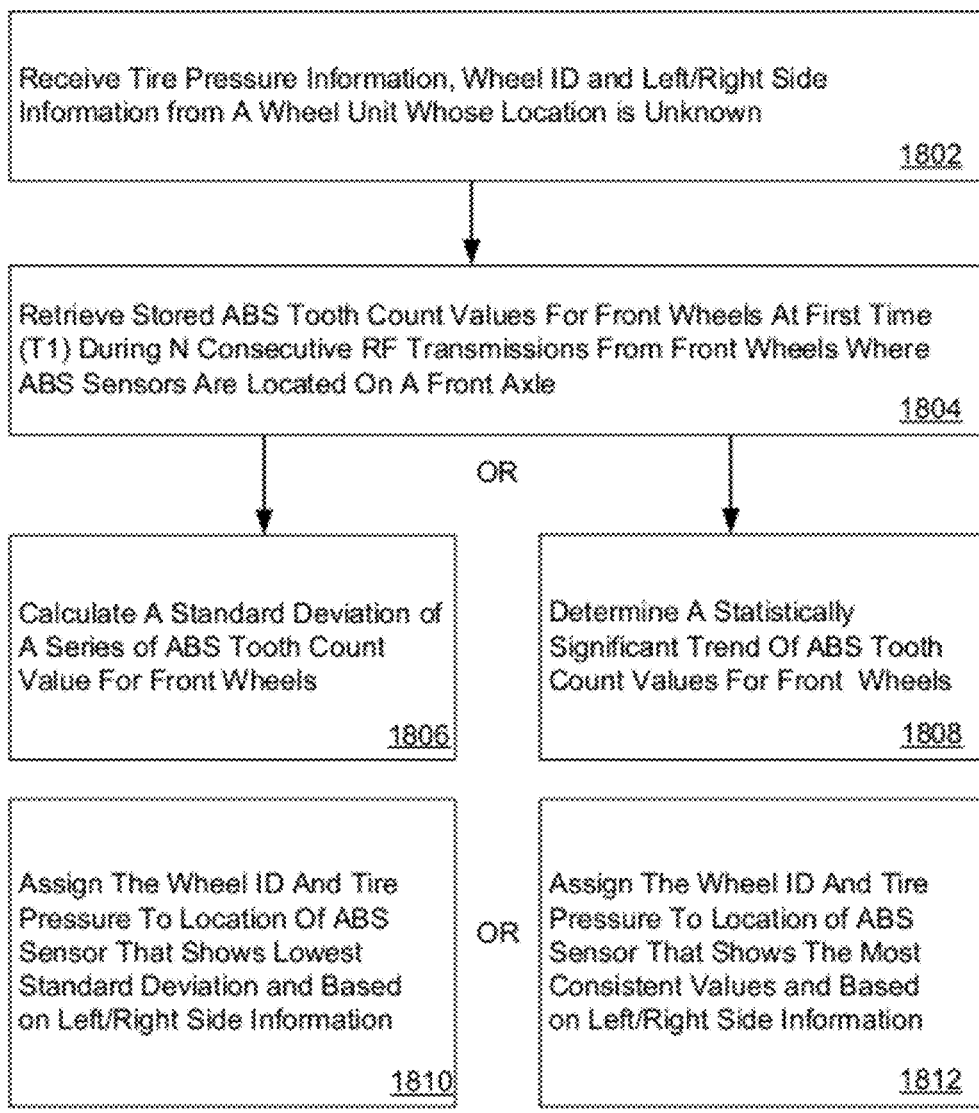
FIG. 18 is a flowchart illustrating another embodiment of an auto-location algorithm where not every wheel has an associated ABS sensor.

In the above-described embodiments, four ABS sensors are associated with each of four wheels in the vehicle. In another embodiment, the vehicle's ABS system does not provide wheel phase and/or speed data for all wheels on the vehicle. FIG. 18 is a flowchart illustrating an embodiment where front wheels are associated with ABS sensors and the remaining wheels are not associated with ABS sensors. Vehicle platforms may differ depending on vehicle models, manufacturers, vehicle designs, etc. Some vehicle platforms are installed with four ABS sensors at each wheel of a vehicle, but other vehicle platforms may be equipped with fewer numbers of ABS sensors. In this embodiment, the ABS system provides information for the wheels on a front axle and does not provide information for the wheels on a rear axle. In that case, the ABS data for the wheels on the front axle are correlated with the wheel phase angle indication from the wheel units mounted on the wheels on the front axle, as described in detail in the above-described embodiments. Accordingly, the ECU determines the location of TPM sensors arranged with the wheels on a single axle.

The remaining wheels are not associated with ABS sensors as they are located on the other axle of the vehicle. With respect to the remaining wheels, the wheel units arranged on the remaining wheels can determine if the TPM sensor is arranged on the left or right hand side of the vehicle. For example, the wheel unit may compare phase signals from an accelerometric device, or other mechanism in order to determine rotation direction, lead/lag relationship, etc. as described in detail in commonly owned U.S. Pat. No. 6,204,758 to Wacker et al. and U.S. Pat. No. 7,367,227 to Stewart et al. of which disclosure is incorporated herein by its entirety. These two patents explain that position on the left or right of the vehicle can be discerned from the polarity of the acceleration data, indicating direction of acceleration and lead/lag relationship associated with clockwise or counterclockwise rotation of a wheel associated with a TPM sensor. Such determination is combined with determination of the front/rear location of the TPM sensor based on the ABS data from the ABS sensor arranged on the single axle.

As illustrated in FIG. 18, the wheel unit provides TPM sensor parameters, a wheel ID and left/right side information (Step 1802). With regard to two wheels where ABS sensors provide ABS data, the stored ABS tooth count values at the first time (T1) is retrieved during N consecutive RF transmissions from front wheels (Step 1804) as described above in connection with FIG. 17. The statistical value of the standard deviation of a series of the ABS tooth count values for the front wheels is calculated (step 1806). Alternatively, or additionally, a statistically significant trend of ABS tooth count values is determined (step 1808). The wheel ID and the TPM sensor parameters are assigned to the ABS sensor that shows the lowest standard deviation and based on the left/right side information from the wheel unit (Step 1810). Alternatively, the wheel ID and the TPM sensor parameters are assigned to the ABS sensor that shows the most consistent values and based on the left/right side information from the wheel unit (Step 1812). This embodiment of using the left/right determination from the wheel unit and the front/rear determination from the ABS sensors may provide flexibility and increased adaptability in making and using the tire pressure monitoring system and methods, because various different vehicle frames from different vehicle manufacturers can be accommodated.

In the above-described embodiment, auto-location of a TPM sensor is also performed based on the snapshot of information at one measurement point (i.e., T1) during a rotation of the wheel when the time delay (TD=T2−T1) is fixed. The transmission time (i.e., T2) is used to calculate and determine the first time (T1) at the ECU 300. The ECU 300 determines the relevant ABS data at the first time (T1) from the rolling window of the ABS data and stores the relevant ABS data. In one embodiment, the relevant ABS data includes ABS tooth count values at the first time (T1). The ECU 300 responds to the wheel phase angle indication included in the RF message 1100 sent from the wheel unit 101. The wheel phase angle indication may include function code bits set to trigger the phase correlation data storage event. In response to the function code bits, the ECU 300 captures the ABS data and determines the relevant ABS data at the first time (T1). Once sufficient ABS data is captured and stored, the relevant ABS data is provided as the input to the auto-correlation algorithm. The auto-correlation algorithm uses the statistical correlation process that considers the standard deviation of or consistency in ABS data traces. Then, the auto-correlation algorithm associates the specific wheel location with the wheel location of the ABS sensor whose ABS data shows the lowest standard deviation, or the most consistent ABS tooth count values and determines the location of the TPM sensor arranged with the specific wheel location.

In this embodiment, no actual wheel phase angle may be provided to the ECU 300. Rather, the wheel phase angle indication, which may be implemented with setting unused bits, using the function code or the temperature data, setting interframe spacings, or any other available mechanism, is provided to the ECU 300. Moreover, based on information at the one-measurement point during the rotation, the auto-location of the wheel is achieved. Accordingly, the above-described the auto-location systems and methods may be simplified and produce fast output. Moreover, power consumption from the auto-location operation may be minimized. Also, the standard data frame protocol may be used as no actual wheel phase angle is included in the RF message data frame. Additionally, the above-described auto-location systems and methods are applicable to various different vehicle frames where four or less ABS sensors are used. This may increase flexibility of the above-described system and methods as specific ECU requirements may be removed and different vehicle frames can be accommodated.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A wheel auto-location method, comprising:
receiving a radio frequency (RF) transmission that indicates a one-measurement point during a rotation of a wheel and TPM sensor parameters, wherein the RF transmission is associated with a phase correlation data storage event trigger;
storing a current content of a rolling window of an antilock brake system ("ABS") data indicative of a wheel phase angle in response to the phase correlation data storage event trigger, wherein a time period covered by the rolling window is the same or greater than a time period between the one-measurement point and a receipt point of the RF transmission, and the current content of the rolling window corresponds to the ABS data between the one-measurement point and the receipt point of the RF transmission;
calculating, by a processor, the one-measurement point based on the time period between the one-measurement point and the receipt point of the RF transmission;
determining, by the processor, relevant ABS data from the current content of the rolling window of the ABS data based on the one-measurement point over time; and
applying, by the processor, an auto-location algorithm to the relevant ABS data to identify a specific location of the wheel where the TPM sensor parameters are associated with the specific location of the wheel.

2. The method of claim 1, wherein the phase correlation data storage event trigger comprises a function code bit that triggers storage of the current content of the rolling window of the ABS data.

3. The method of claim 1, wherein the RF transmission comprises a series of RF transmissions, and the phase correlation data storage event trigger comprises a predetermined interframe spacing of the RF transmissions that triggers storage of the current content of the rolling window of the ABS data.

4. The method of claim 3, further comprising:
recognizing the predetermined interframe spacing of the series of RF transmissions; and
determining the receipt point of a first RF transmission among the series of RF transmissions.

5. The method of claim 1, wherein the phase correlation data storage event trigger comprises information encoded in a dataframe of the RF transmission used to encode temperature data, and triggers storage of the current content of the rolling window of the ABS data.

6. The method of claim 1, wherein the step of applying the auto-location algorithm comprises:
providing the relevant ABS data at the one-measurement point over time as an input;
determining a historic trace of the relevant ABS data at the one-measurement point; and
identifying the specific location of the wheel associated with an ABS sensor whose historic trace of the relevant ABS data at the one-measurement point shows a substantially consistent tooth count value.

7. The method of claim 1, wherein the step of applying the auto-location algorithm comprises:
providing the relevant ABS data at the one-measurement point over time as an input;
determining a historic trace of the relevant ABS data at the one-measurement point; and
identifying the specific location of the wheel associated with an ABS sensor whose historic trace of the relevant ABS data at the one-measurement point shows a statistically significant value.

8. The method of claim 7, wherein the statistically significant value comprises a lowest standard deviation.

9. The method of claim 7, wherein the statistically significant value comprises a statistically significant trend in the stored data.

10. A method for performing auto-location of a wheel in a vehicle, comprising the steps of:
arranging a wheel unit to be associated with a wheel of the vehicle, the wheel unit comprising a tire pressure monitoring ("TPM") sensor and a wheel phase angle sensor and the wheel unit transmitting TPM sensor parameters;
arranging an antilock brake system ("ABS") sensor to be associated with each wheel of the vehicle, the ABS sensor producing ABS data indicative of the wheel phase angle;
upon rotation of the wheel, detecting with the wheel phase angle sensor a first time (T1) at a predetermined wheel phase angle;
at a second time (T2), sending from the wheel unit an radio frequency (RF) transmission;
at a processor of an electronic control unit ("ECU"), receiving the RF transmission;
continually maintaining a rolling window of the ABS data associated with each wheel;
storing a current content of the rolling window of ABS data for each wheel upon receipt of the RF transmission;
calculating, by the processor, the first time (T1) based on a predetermined time delay (T2−T1) between the first time (T1) and the second time (T2);
determining, by the processor, the ABS data at the first time (T1) for each wheel; and
identifying a location of the wheel whose historic trace of ABS data matches with a predetermined criterion so that TPM sensor parameters are assigned to the identified location of the wheel.

11. A wheel auto-location method, comprising:
receiving an RF transmission indicating a predetermined one-measurement point during rotation of a wheel and TPM sensor parameters;
calculating, by a processor, the predetermined one-measurement point based on the RF transmission;
maintaining a rolling window of ABS data and capturing a relevant rolling window of ABS data at the predetermined one-measurement point;
correlating, by the processor, the ABS data at the one-measurement point with a specific location of a wheel based on statistical processing of the relevant rolling window of ABS data at the predetermined one-measurement point; and
determining, by the processor, the specific location of the wheel where the TPM sensor parameters are assigned.

12. The method of claim 11, wherein the RF transmission comprises an encoded predetermined time delay indicative of a wheel phase angle in a data frame of the RF transmission.

13. The method of claim 11, wherein the RF transmission comprises an encoded pseudo-random number indicative of a wheel phase angle in a data frame of the RF transmission.

14. A tire pressure monitoring system for performing auto-location of a wheel in a vehicle, comprising:
a wheel unit to be associated with a wheel of the vehicle, the wheel unit comprising:
a TPM sensor that measures TPM sensor parameters of the wheel; and
a wheel phase angle sensor that detects an angle of interest (P1) at a first time (T1);
wherein the wheel unit transmits at the second time (T2) a radio frequency (RF) message comprising:
an identification of the TPM sensor; and
measured TPM sensor parameters; and
an electronic control unit ("ECU") of the vehicle in communication with the wheel unit and a wheel phase and/or speed sensor; and
computer program code operable in conjunction with the ECU of the vehicle, the ECU in communication with the wheel unit and the wheel phase and/or speed sensor of the vehicle, wherein in response to the phase correlation data storage event trigger, the ECU is operable in response to the computer program code to execute instructions of:
calculating the first time (T1) based on a predetermined time delay (T2-T1);
storing wheel phase and/or speed data indicative of wheel phase angle based on a phase correlation data storage event trigger and determining the wheel phase and/or speed data at the first time (T1);
correlating a location of the wheel with a location of the wheel phase and/or speed sensor based on a historic trace of the wheel phase and/or speed data at the first time (T1) based on a predetermined criteria; and
determining the location of the wheel based on the correlation and associating the TPM sensor parameters with the determined location of the wheel.

15. The system of claim 14, wherein the wheel phase and/or speed data comprise Antilock Brake System (ABS) data indicative of the wheel phase angle that includes a count of a number of ABS teeth or data which represents the number of ABS teeth that have passed each ABS sensor in a given period of time.

16. The system of claim 14, wherein the wheel phase and/or speed data comprise the ABS data associated with one of front wheels and rear wheels.

17. The system of claim 16, wherein the wheel unit transmits the RF message that further comprises one of left side location information and right side location information of the TPM sensor, and the ECU is further operable to execute instructions of determining the location of the wheel based on the correlation and one of left side location information and right side location information of the TPM sensor.

18. The system of claim 14, wherein the ECU is further operable to execute instructions of correlating the location of the wheel with the location of the ABS sensor whose historic trace shows a lowest standard deviation of ABS tooth count values at the first time (T1).

19. The system of claim 14, wherein the RF message comprises a phase correlation data storage event trigger that corresponds to at least a portion of temperature bits, the portion of the temperature bits triggering the ECU to store the wheel phase and/or speed data at the first time (T1) for each wheel.

20. The system of claim 14, wherein the RF message comprises temperature bits and the portion of the temperature bits indicates temperature that is above a maximum operating temperature of the tire pressure monitoring sensor.

* * * * *